United States Patent
Oh et al.

(10) Patent No.: US 10,613,744 B2
(45) Date of Patent: Apr. 7, 2020

(54) MOBILE TERMINAL AND METHOD FOR CONTROLLING THE SAME

(71) Applicant: LG ELECTRONICS INC., Seoul (KR)

(72) Inventors: Euitaek Oh, Seoul (KR); Yoonchan Won, Seoul (KR); Sanga Kim, Seoul (KR); Junho Seo, Seoul (KR); Minhyeok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 607 days.

(21) Appl. No.: 15/341,897

(22) Filed: Nov. 2, 2016

(65) Prior Publication Data
US 2017/0285933 A1    Oct. 5, 2017

(30) Foreign Application Priority Data
Apr. 4, 2016    (KR) ........................ 10-2016-0041221

(51) Int. Cl.
| | | |
|---|---|---|
| G06F 3/0488 | (2013.01) | |
| G06F 3/0481 | (2013.01) | |
| G06F 3/0484 | (2013.01) | |
| G06F 3/0485 | (2013.01) | |

(52) U.S. Cl.
CPC ........ *G06F 3/04883* (2013.01); *G06F 3/0485* (2013.01); *G06F 3/04817* (2013.01); *G06F 3/04845* (2013.01); *G06F 3/04847* (2013.01); *G06F 3/04886* (2013.01)

(58) Field of Classification Search
CPC .............. G06F 3/0237; G06F 15/0291; G06F 2203/04809; G06F 3/04886
See application file for complete search history.

(56) References Cited

U.S. PATENT DOCUMENTS

| | | | | |
|---|---|---|---|---|
| 5,651,107 A | * | 7/1997 | Frank ................... | G06F 3/0481 345/589 |
| 6,333,753 B1 | * | 12/2001 | Hinckley ............ | G06F 3/03543 345/156 |
| 2005/0248525 A1 | * | 11/2005 | Asai .................... | G06F 3/04883 345/156 |
| 2009/0031237 A1 | * | 1/2009 | Jessen .................. | G06F 3/0481 715/768 |

(Continued)

FOREIGN PATENT DOCUMENTS

KR    10-2011-0108644 A    10/2011

*Primary Examiner* — Dino Kujundzic
(74) *Attorney, Agent, or Firm* — Birch, Stewart, Kolasch & Birch, LLP

(57) ABSTRACT

A mobile terminal including a wireless communication processor configured to provide wireless communication; a touch screen; and a controller configured to display a first content containing an input field region on the touch screen, display a virtual keypad on the first content for inputting information into the input field, in response to a first touch input applied to the virtual keypad exceeding a reference pressure, increase a transparency of the displayed virtual keypad so as to display a screen layered below the virtual keypad, and in response to a second touch input applied to the screen, limit an input of a control command to a key of the virtual keypad and control the displayed screen based on the second touch input.

18 Claims, 25 Drawing Sheets

(56) References Cited

U.S. PATENT DOCUMENTS

| | | | | |
|---|---|---|---|---|
| 2010/0323762 | A1* | 12/2010 | Sindhu | G06F 1/1613 |
| | | | | 455/566 |
| 2011/0107212 | A1* | 5/2011 | Jeong | G06F 3/0481 |
| | | | | 715/702 |
| 2013/0024767 | A1* | 1/2013 | Nam | G06F 3/0488 |
| | | | | 715/251 |
| 2014/0160049 | A1* | 6/2014 | Shin | G06F 3/0486 |
| | | | | 345/173 |
| 2015/0067573 | A1 | 3/2015 | Seo | |
| 2015/0095833 | A1 | 4/2015 | Kim et al. | |
| 2015/0128080 | A1* | 5/2015 | Liu | G06F 3/04886 |
| | | | | 715/768 |
| 2017/0083586 | A1* | 3/2017 | Huang | G06F 17/2785 |
| 2018/0052963 | A1* | 2/2018 | Eguchi | A61B 8/4427 |

* cited by examiner

MOBILE TERMINAL AND METHOD FOR CONTROLLING THE SAME

CROSS-REFERENCE TO RELATED APPLICATIONS

This application claims priority to Korean Patent Application No. 10-2016-0041221, filed on Apr. 4, 2016 in Korea, the entire contents of which is hereby incorporated by reference in its entirety.

BACKGROUND OF THE DISCLOSURE

1. Field of the Disclosure

The present disclosure relates to a mobile terminal having a touch screen, and a control method thereof.

2. Background of the Disclosure

Terminals may be generally classified into mobile/portable terminals or stationary terminals. Mobile terminals may also be classified as handheld terminals or vehicle mounted terminals.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can capture still images or moving images, play music or video files, play games, receive broadcast and the like, so as to be implemented as an integrated multimedia player.

Furthermore, the mobile terminal can execute a plurality of applications based on a user input. In this instance, the execution screens of the plurality of applications are generated on a plurality of layers. Here, only an execution screen existing on the uppermost layer is typically displayed on a display of the mobile terminal.

Further, when accessing another execution screen layered below an execution screen currently displayed on the display, there is an inconvenience in that the current screen should be switched to the another execution screen. In particular, even when it is desired to check the information of the another execution screen while performing an input on the current screen, there is a complexity and inconvenience in that the current screen should be switched to the another execution screen and then switched again to the current screen from the another execution screen. Furthermore, this causes confusion for the user as his or her interactive object is frequently changed.

SUMMARY OF THE DISCLOSURE

Accordingly, an object of the present disclosure is to provide a mobile terminal capable of checking information on an execution screen layered below while maintaining a currently displayed screen, and a control method thereof.

Furthermore, another object of the present disclosure is to provide a mobile terminal capable of selectively checking user's desired information among execution screens layered below and immediately applying the checked information to the current screen, and a control method thereof.

A mobile terminal according to an embodiment of the foregoing present disclosure may include a display unit configured to display a first content containing an input field region and a virtual keypad on the first content; and a controller configured to control a screen to exhibit a screen layered below while increasing the transparency of the displayed virtual keypad when a touch input exceeding a reference pressure is applied to the virtual keypad. Furthermore, the controller may control a screen exhibited on the virtual keypad based on a touch input while limiting an input of a control command to a key on the virtual keypad when the touch input is applied to the screen exhibited on the virtual keypad.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another. When an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like. However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
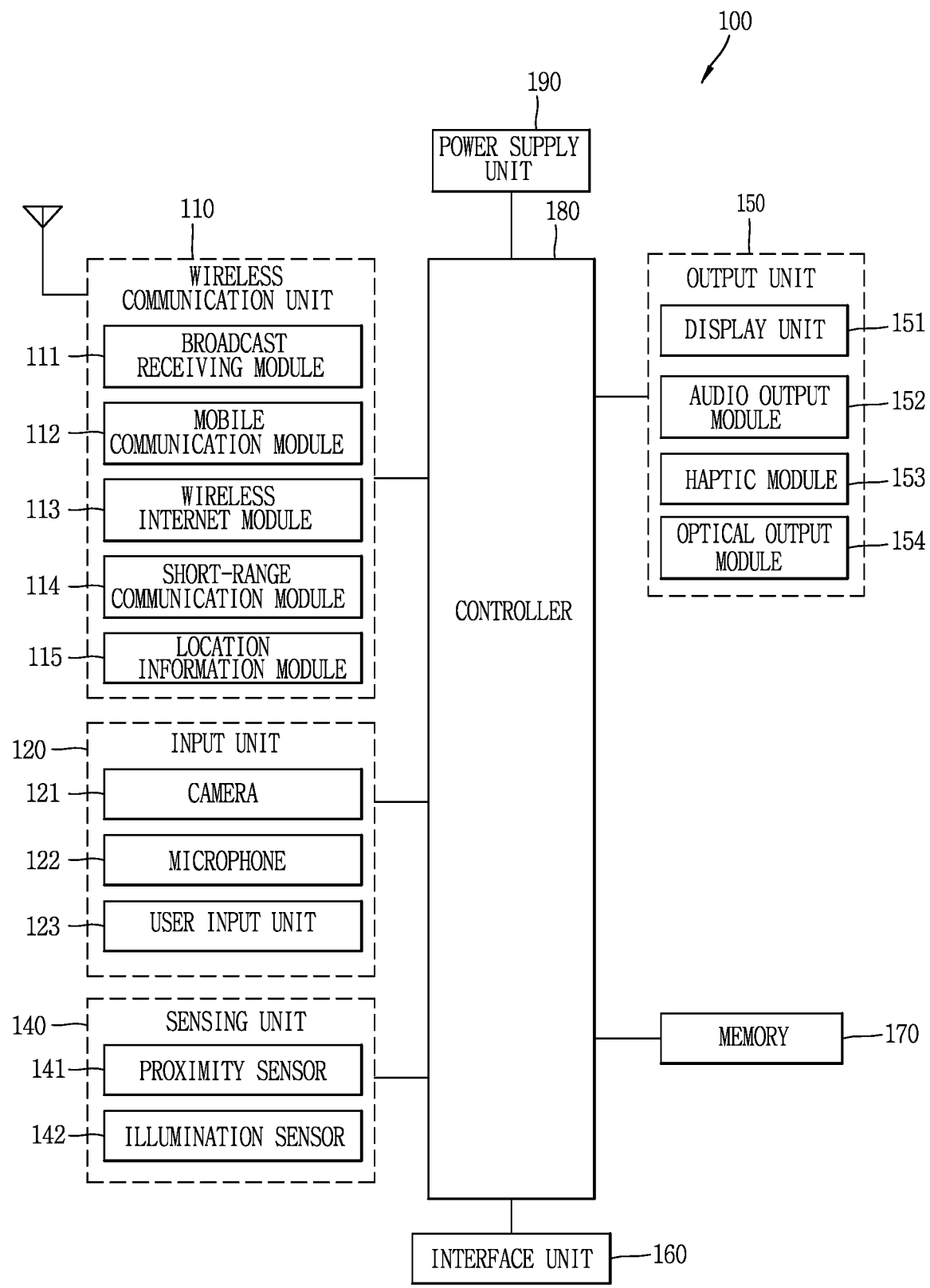
FIG. 1A is a block diagram illustrating a mobile terminal according to an embodiment of the present disclosure.
Figure 1B:
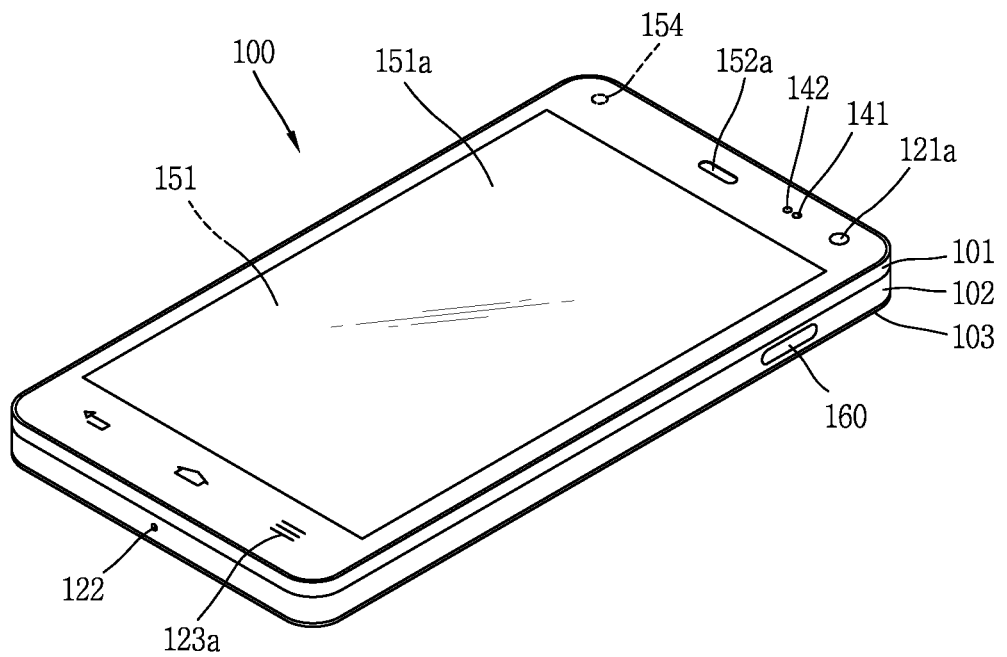
FIGS. 1B and 1C are conceptual views in which a mobile terminal according to an embodiment of the present disclosure is seen in different directions from each other.
Figure 1C:
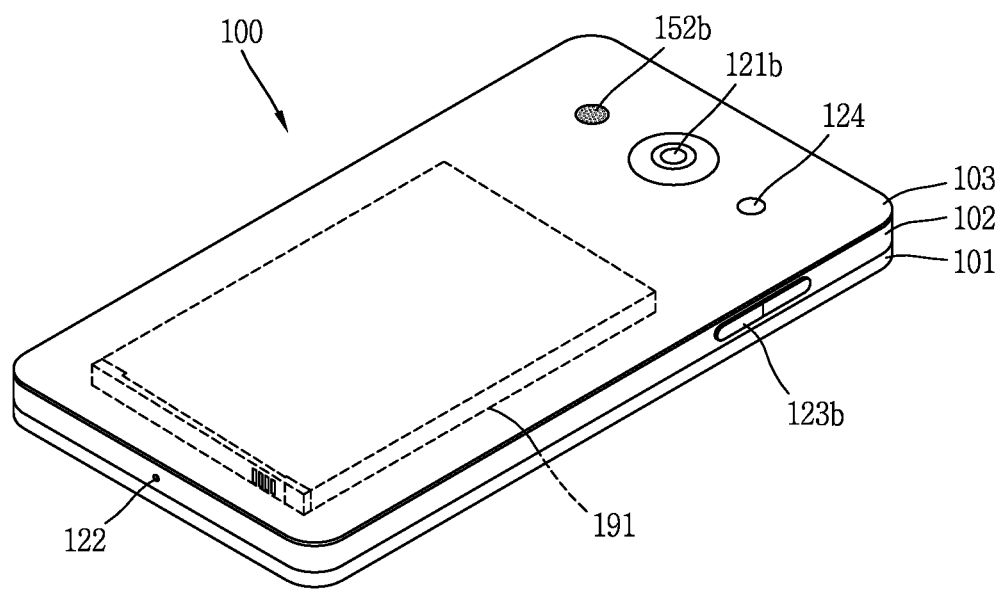

Referring to FIGS. 1A through 1C, FIG. 1A is a block diagram of a mobile terminal in accordance with the present disclosure, FIGS. 1B and 1C are conceptual views of one example of the mobile terminal, viewed from different directions. The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like. The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). Further, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). Further, the application programs may be stored in the memory 170, installed in the mobile terminal 100, and executed by the controller 180 to perform an operation (or a function) of the mobile terminal 100.

The controller 180 can typically control an overall operation of the mobile terminal 100 in addition to the operations associated with the application programs. The controller 180 can provide or process information or functions appropriate for a user by processing signals, data, information and the like, which are input or output by the aforementioned components, or activating the application programs stored in the memory 170.

The controller 180 can control at least part of the components illustrated in FIG. 1, in order to drive the application programs stored in the memory 170. In addition, the controller 180 can drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration. First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages. The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to WiBro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which can exchange data with the mobile terminal 100 (or to cooperate with the mobile terminal 100). The short-range communication module 114 may sense (recognize) a wearable device, which can communicate with the mobile terminal), near the mobile terminal 100. In addition, when the sensed wearable device is a device which is authenticated to communicate with the mobile terminal 100 according to the present disclosure, the controller 180 can transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 is not limited to a module for directly calculating or acquiring the location of the mobile terminal.

Hereinafter, the input unit 120 will be described in more detail. The input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. Further, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). Further, the microphone 122 may include assorted noise removing algorithms to remove noise generated in the course of receiving the external audio signal.

The user input unit 123 may receive information input by a user. When information is input through the user input unit 123, the controller 180 can control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. Further, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 can control an operation of the mobile terminal 100 or execute data processing, a function or an operation associated with an application program installed in the mobile terminal based on the sensing signal. Hereinafter, description will be given in more detail of sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this instance, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.).

Further, the controller 180 can process data (or information) corresponding to the proximity touches and the proximity touch patterns sensed by the proximity sensor 141, and output visual information corresponding to the process data on the touch screen. In addition, the controller 180 can control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like. As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180 or the controller 180 itself.

Further, the controller 180 can execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 can calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor and a laser sensor. The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images.

The stereoscopic display unit 152 may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user can feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an e-mail reception, an information reception through an application, and the like.

A signal output by the optical output module 154 may be implemented so the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform controlling and processing associated with voice calls, data communications, video calls, and the like, or perform pattern recognition processing to recognize a handwriting input or a picture drawing input performed on the touch screen as characters or images, respectively. In addition, the controller 180 can control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected. As another example, the power supply unit 190 may be configured to recharge the battery in a wireless manner without use of the connection port.

Here, the power supply unit 190 may receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure is not limited to this, but also may be applicable to various structures such as watch type, clip type, glasses type or folder type, flip type, slide type, swing type, swivel type, or the like, in which two and more bodies are combined with each other in a relatively movable manner. The description to be associated with a specific type of mobile terminal or on a specific type of mobile terminal will be also typically applied to another type of mobile terminal.

Here, the terminal body may be understood as a conception which indicates the mobile terminal 100 as at least one assembly. The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. Further, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like. Unlike the example which the plurality of cases form an inner space for accommodating such various components, the mobile terminal 100 may be configured such that one case forms the inner space. In this example, a mobile terminal 100 having a uni-body formed so synthetic resin or metal extends from a side surface to a rear surface may also be implemented.

Further, the mobile terminal 100 may include a waterproofing unit for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

Here, those components is not limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display. The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 can generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds. The window 151a of the display unit 151 may include a sound hole for emitting sounds generated from the first audio output module 152a. Here, the present disclosure is not limited to this. It may also be configured such that the sounds are released along an assembly gap between the structural bodies (for example, a gap between the window 151a and the front case 101). In this instance, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an e-mail reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure is not limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

Further, as another example of the user input unit 123, a rear input unit may be disposed on the rear surface of the terminal body. The rear input unit may be manipulated by a user to input a command for controlling an operation of the mobile terminal 100. The content input may be set in various ways.

For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure is not limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

Further, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds. The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a. The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject. The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1) for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

Further, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Hereinafter, embodiments associated with a control method which can be implemented in the mobile terminal having the foregoing configuration will be described with reference to the attached drawings. It should be understood by those skilled in the art that the present invention can be embodied in other specific forms without departing from the concept and essential characteristics thereof.

A mobile terminal 100 according to an embodiment of the present disclosure configured to include at least one of the foregoing configurations can display a first content containing an input region on the display unit 151 according to a user input, and display a virtual keypad in one region of the displayed first content. Thus, when the virtual keypad is displayed, a partial image of the first content that has been displayed in the relevant region is hidden by the virtual keypad.

In this state, when a touch input exceeding a reference pressure is applied to the displayed virtual keypad, the controller 180 of the mobile terminal 100 can control a screen to exhibit a screen layered below, for example, the hidden partial image of the first content, while increasing the transparency of the displayed virtual keypad. In other words, a screen layered below selected according to a level of touch and a current screen may be shown at the same time to allow the prediction of an intuitive interaction without switching between the layered screens.

Thus, the mobile terminal 100 can be implemented to differentiate a touch level applied to a touch sensor provided in the display unit 151 to perform a different operation. Specifically, it is possible to differentiate a touch level based on a proportional relationship between a pressure and a resistance of the touch or an inverse relationship between a pressure and a resistance of the touch. Furthermore, it is possible to distinguish operations in proportion (or inverse proportion) to a change of the pressure of the touch into two types, or set operations in proportion (or inverse proportion) to a change of the pressure of the touch to several levels and divide them into a plurality of types.

For example, when a touch input below a reference pressure is applied to a virtual keypad, the controller 180 can control the corresponding character on the keypad to be selected and entered. On the contrary, when a touch input exceeding a reference pressure is applied to the virtual keypad, the controller 180 can control images layered below to be exhibited while increasing the transparency of the entire virtual keypad.

Furthermore, only when a touch input exceeding a reference pressure is applied to a specific region of the virtual keypad, for example, a boundary region or the like, the controller 180 can control an image layered below to be exhibited while adjusting the transparency.

As described above, key images on the virtual keypad and a partial image of the first content can be shown at the same time based on a touch level of the touch input to subsequently perform an additional interaction using a virtual keypad while at the same time checking information layered below.

For example, the controller 180 can control a screen layered below to be displayed on the virtual keypad only while a touch input exceeding a reference pressure is maintained on the virtual keypad. In this instance, when the touch input exceeding a reference pressure is released, only the virtual keypad is displayed again. Accordingly, a user can non-discontinuously and naturally extend an additional interaction using the virtual keypad without screen switching.

Further, when a touch input is subsequently applied when a virtual keypad and a partial image of the first content layered below are displayed at the same time, the controller 180 can limit an input of a control command to a key on the virtual keypad, and control only a partial image of the first content based on the touch input. In other words, while the virtual keypad and the first content layered below are displayed at the same time, it may interact with a partial image of the first content among a plurality of screens.

Further, when a touch input is applied when a partial image of the first content layered below disappears and only the virtual keypad is remained, the controller 180 executes a control command corresponding to an input of a key on the virtual keypad. Alternatively, when an additional touch input for entering a control command to a key on the virtual keypad when the virtual keypad and a partial image of the first content are displayed at the same time, an interaction with the virtual keypad is allowed even when the virtual keypad and a partial image of the first content are displayed at the same time.

As described above, an embodiment of the present disclosure may be implemented to display a screen layered below along with a current screen without screen switching according to a touch level, and allow the exhibited screen layered below to disappear again when the touch is released, thereby securing the predictability of an interaction.

Figure 2:
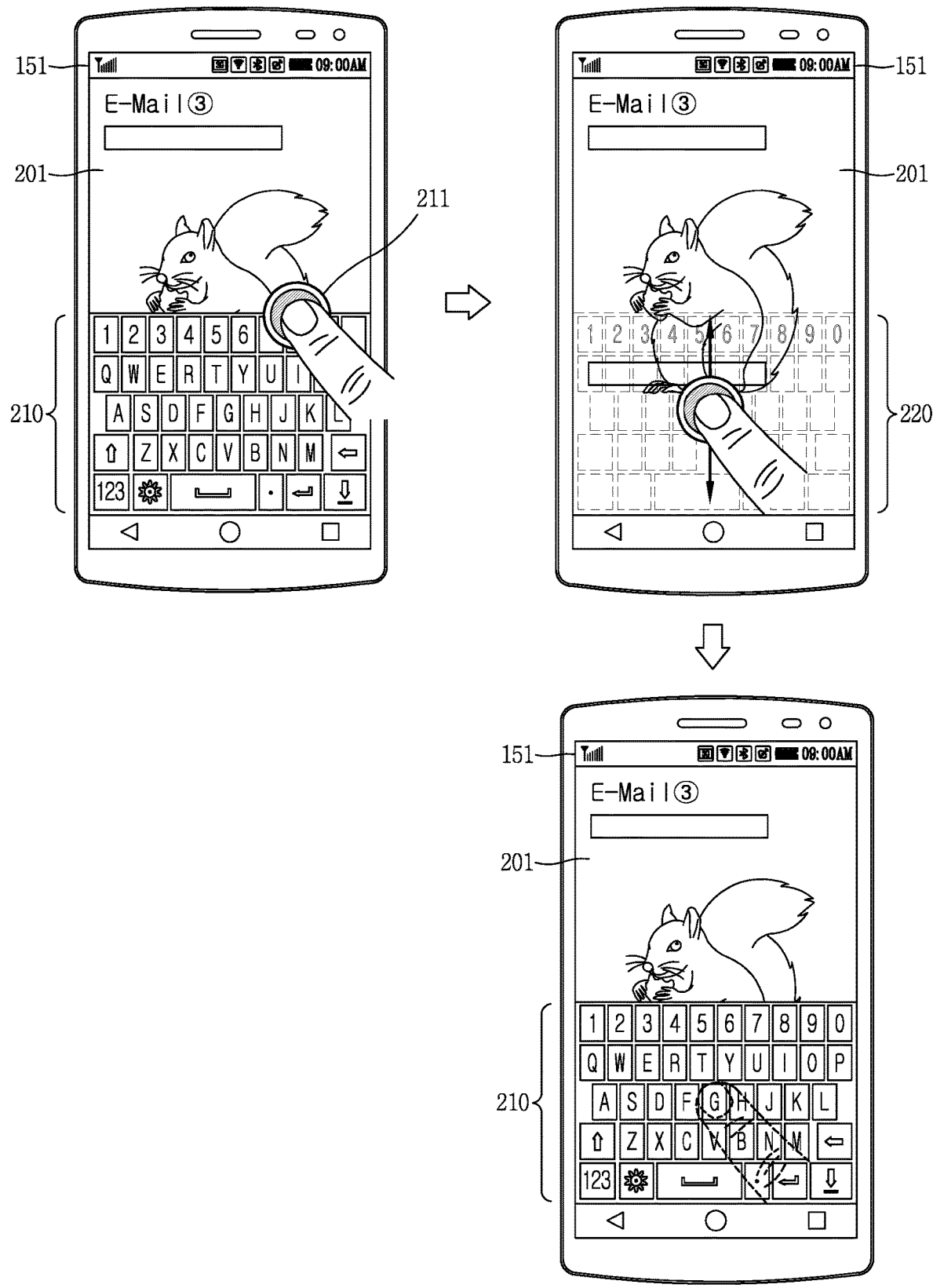
FIG. 2 is a conceptual views illustrating an exemplary operation implemented in a mobile terminal according to an embodiment of the present disclosure.

Hereinafter, FIG. 2 is a conceptual views illustrating an exemplary operation implemented in a mobile terminal according to an embodiment of the present disclosure. In FIG. 2, an e-mail compose screen 201 and a virtual keypad 210 for entering e-mail content are displayed on the display unit 151.

A user can apply a touch input 211 exceeding a reference pressure to one region of the virtual keypad 210, for example, an upper frame of the virtual keypad 210, to check hidden information without entering e-mail content using the virtual keypad 210 or while entering e-mail content.

As described above, when a touch input exceeding a reference pressure is applied thereto, the remaining portion of the e-mail compose screen 201 that is hidden by the virtual keypad 210, namely, an image layered below, appears (220). Here, the transparency of the virtual keypad 210 can vary in proportion to a touch level of the touch input. For example, as increasing a touch level of the touch input applied to the virtual keypad 210 in FIG. 2, an image layered below will be more clearly displayed while increasing the transparency of the virtual keypad 210 (including the virtual keypad 210 temporarily disappearing).

Furthermore, when there are a plurality of screens layered below, for example, when the execution screens of a plurality of applications are layered, the controller 180 can select screens with different layers based on a touch level of the touch input. In other words, a visual effect such as moving between layers is displayed by varying a touch level of the touch input.

Specifically, the controller 180 can select a screen by further moving to a lower layer as increasing a touch level of the touch input applied to the virtual keypad 210. Here, as the touch level gradually increases, a plurality of screens layered below can be sequentially displayed on the virtual keypad.

When a horizontally and vertically dragged touch input is applied to a region displayed with the virtual keypad when the transparent virtual keypad and the remaining portion of the e-mail compose screen are displayed at the same time, the controller 180 can control an e-mail compose screen layered below based on the applied touch input. Here, the e-mail compose screen 201 that has been displayed from the beginning in a region out of the virtual keypad 210 is continuously maintained.

While the virtual keypad and an image layered below are displayed at the same time as described above, the virtual keypad layered above can be controlled based on a different input scheme or additional input. For example, when a double-short touch input is applied to the virtual keypad, only an object interacting with a user can be changed to a virtual keypad while maintaining a current display state. Here, guide information for notifying a change of the interaction object and the changed object may appear and then disappear.

Further, when a touch input that has been applied to the virtual keypad 210 is released, a screen layered below can disappear while the transparent virtual keypad becomes non-transparent again (210). An emotional metaphor can be provided such as allowing an object floating on the water to go into the water when pressed by hand and then come out of the water when released from the hand. Accordingly, a user can intuitively predict an interaction according to a touch level.

Figure 3:
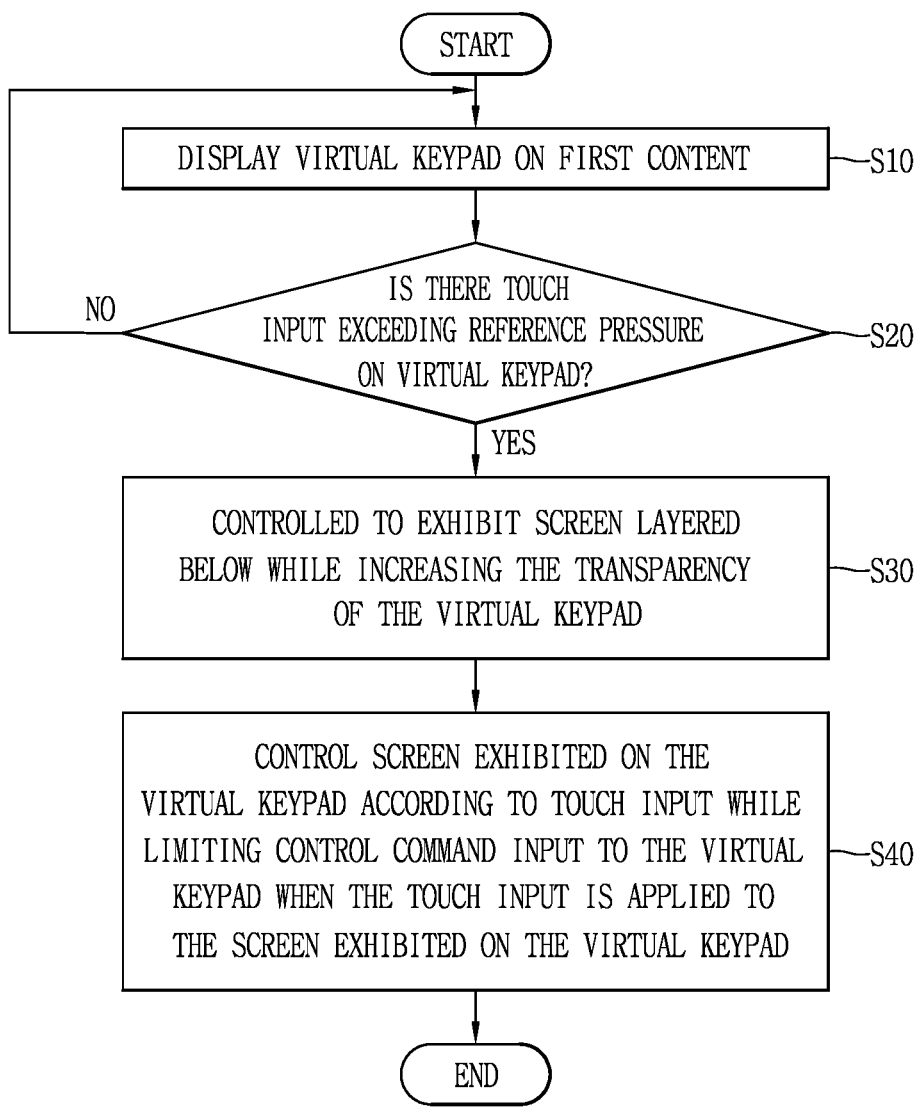
FIG. 3 is a flow chart illustrating the operation of FIG. 2.

Next, FIG. 3 is a flow chart illustrating the foregoing operation of FIG. 2. First, the mobile terminal 100 displays a virtual keypad on a first content displayed on the display unit 151. Here, the type of the first content has no limitation, and the first content may include at least one input region. In this instance, as a touch is applied to an input region of the first content, for example, a virtual keypad can appear below the first content.

In this state, when a touch input exceeding a reference pressure is applied to the virtual keypad (Yes in S20), a screen layered below appears along therewith while the entire displayed virtual keypad becomes transparent (S30). Here, the reference pressure denotes a touch level at which a voltage detected by the touch forms a reference voltage range (for example, within 1.5 V). Accordingly, a touch input exceeding a reference pressure denotes a touch level at which a voltage detected by a touch applied to an arbitrary position or predetermined region (for example, an upper frame of the virtual keypad) forms a voltage range exceeding a reference voltage range (for example, 1.5~3.0 V).

In other words, the controller 180 can perform a different operation according to a touch level of the touch input applied to the virtual keypad. In other words, the controller 180 controls a character corresponding to a touch position to be selected when a touch input less than a reference pressure is applied to the virtual keypad, and a screen layered below to be exhibited while changing the virtual keypad to a transparent one when a touch input exceeding a reference pressure.

Then, when a touch input or proximity touch is applied to the screen layered below and exhibited on the transparent virtual keypad, the controller 180 can limit an input to a control command to the virtual keypad and control the screen at a lower layer exhibited on the virtual keypad based on the touch input or proximity touch (S40).

In other words, the present disclosure controls a screen layered below while maintaining a layered order without switching a screen layered above and a screen layered below to control the screen layered below, thereby providing a more intuitive interaction to the user.

Hereinafter, specific examples of controlling a layered-below screen exhibited on the keypad using a touch input will be described with reference to FIGS. 4A, 4B, 5, 6A and 6B. First, referring to FIG. 4A, when a touch input exceeding a reference pressure is applied to one region of the virtual keypad, for example, an upper frame, in a state that the e-mail compose screen 401 and the virtual keypad 410 are displayed on the display unit 151, a hidden image layered below is exhibited while the virtual keypad becomes transparent (420).

Figure 4A:
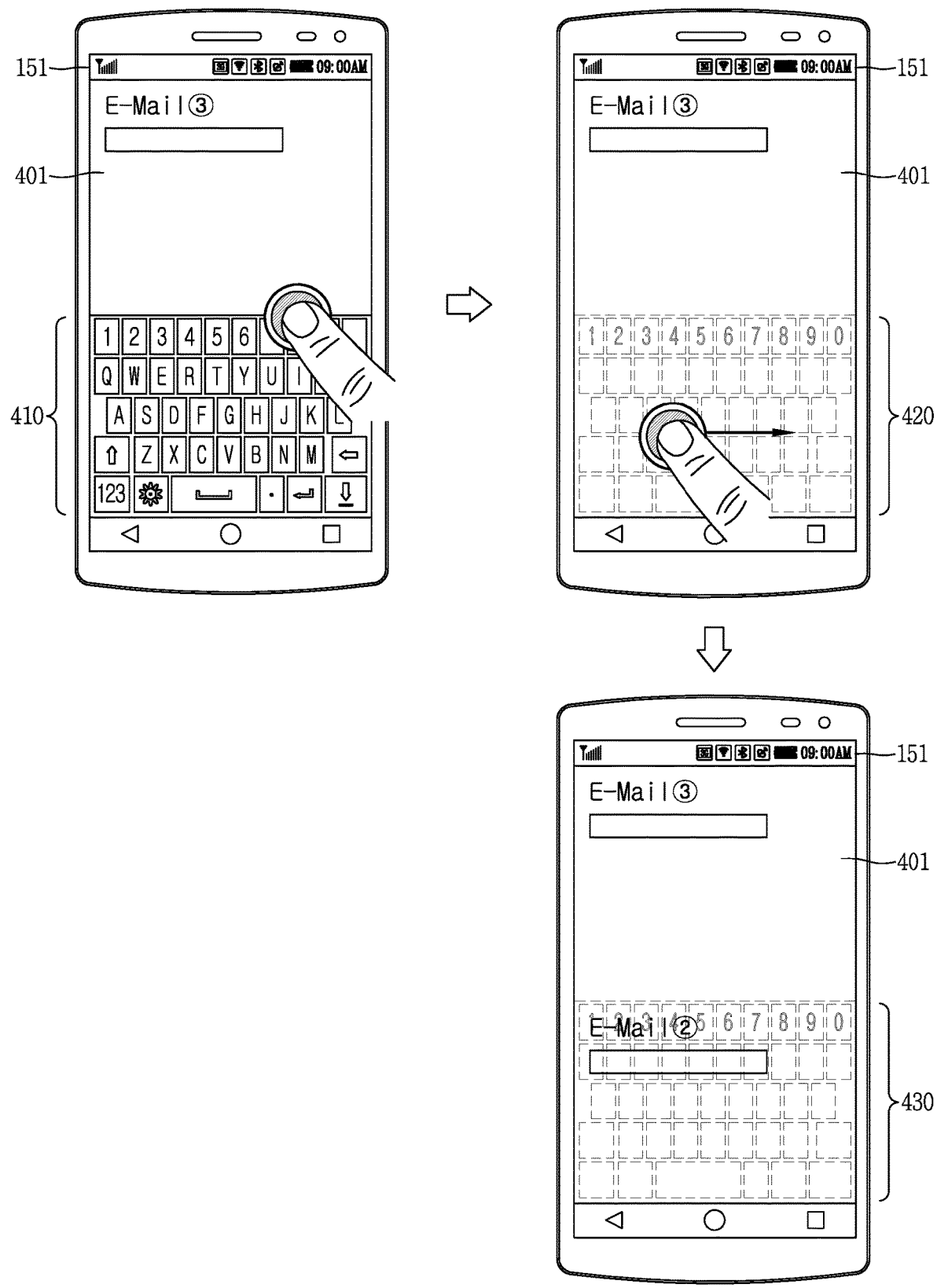
FIGS. 4A, 4B, 5, 6A and 6B are exemplary views illustrating a method of controlling a screen layered below exhibited on a keypad using a touch input in a mobile terminal according to an embodiment of the present disclosure.

Here, when a drag touch input is applied in a horizontal direction to an image exhibited on the virtual keypad as illustrated in FIG. 4A, the controller 180 changes an image to be displayed on the virtual keypad to a different image associated with a currently exhibited image 420. For example, it may be switched to a previous e-mail screen (E-Mail②) that has been sent to and received from the recipient or sender of a currently composing e-mail, a most recently received e-mail screen or the like. While images are switched as described above, the display of the virtual keypad and the display status of the e-mail compose screen 401 are continuously maintained.

Figure 4B:
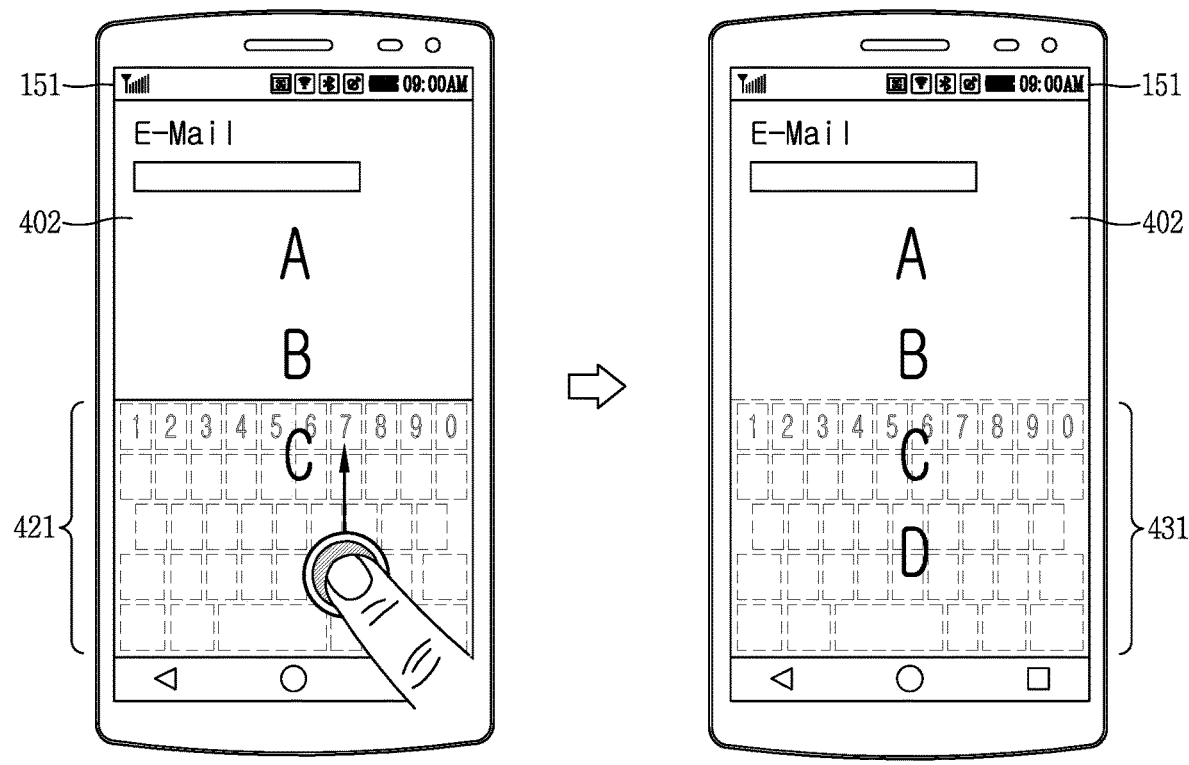

Further, as illustrated in FIG. 4B, when a drag touch input is applied in a vertical direction to an image exhibited on the virtual keypad, the controller 180 can scroll an image 421 exhibited on the virtual keypad in a top-down direction. Accordingly, first information ("C") disappears from an image 420 exhibited on the virtual keypad, and second information ("E", "F") is displayed (431). While the image 420 is scrolled as described above, the e-mail compose screen 402 that has been displayed in a region out of the virtual keypad is maintained without being scrolled. In other words, screens 421, 431 exhibited in a region of the virtual keypad and a screen 402 displayed in a region out of the virtual keypad are controlled in an independent manner from each other.

Furthermore, when a touch input exceeding a reference pressure applied to the virtual keypad is released, the controller 180 can control a screen to allow an image exhibited on the virtual keypad to disappear while decreasing the transparency of the virtual keypad to an original value. Here, the speed of decreasing the transparency of the virtual keypad may be proportional to a level at which a touch input applied to the virtual keypad is maintained.

Figure 5:
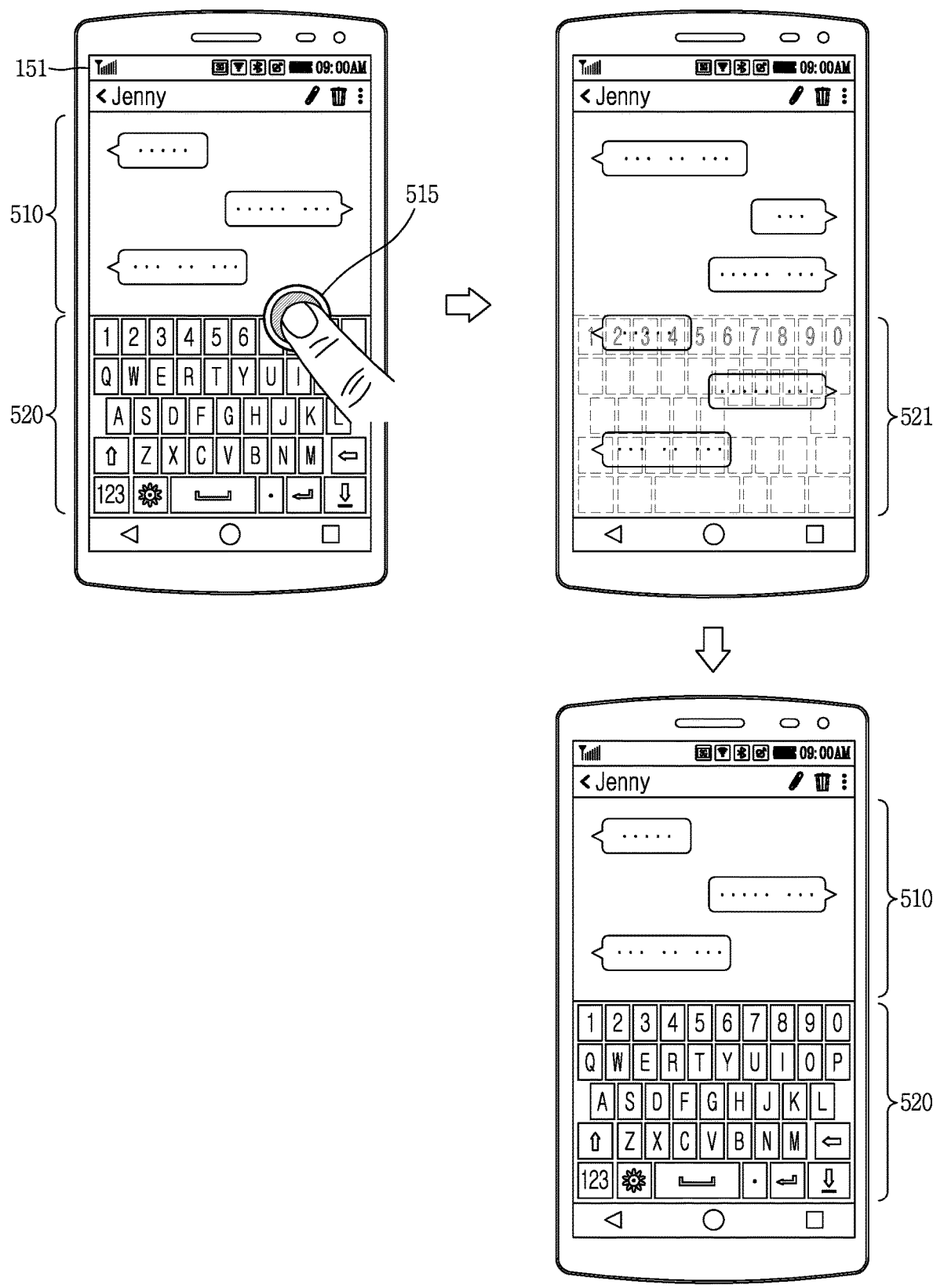

Referring to FIG. 5, when a touch input 5515 exceeding a reference pressure is applied to an upper frame of the virtual keypad 520, conversation contents (i.e., information scrolled upward when the virtual keypad is displayed) that have disappeared from the screen appear as the virtual keypad is displayed. Accordingly, a user can recheck previous conversation contents that have been displayed on the display unit 151 just prior to displaying the virtual keypad 520 when the virtual keypad is maintained. However, at this time, previous conversation contents may be checked through an upper region of the display unit 151 other than the virtual keypad.

In other words, the conversation content that has been displayed in a first region 510 of the display unit 151 is moved and displayed in a region of the transparent virtual keypad (521), and conversation contents just prior to the conversation content are scrolled and displayed in the first region 510. When a touch input applied to the virtual keypad is released in this state, the transparency of the virtual keypad is gradually decreased and changed to be non-transparent again, and the conversation contents are scrolled and displayed upward again. In other words, a recently transmitted/received message is moved from the virtual keypad and displayed again in the first region 510. Then, a user can subsequently compose a message using the virtual keypad.

Furthermore, even while a touch input applied to the virtual keypad has been released but part of the conversation screen is still exhibited on the virtual keypad, the controller 180 can recognize a touch input applied to a key on the virtual keypad. In other words, when a touch input applied to the virtual keypad is released, the controller 180 can immediately release the limitation of an input to the key on the virtual keypad.

According to the foregoing embodiment, a user can omit a complicated process (at least two inputs) in which the virtual keypad should be folded to check conversation content and then unfolded again to check previous conversation content while entering message content. In other words, according to an embodiment of the present disclosure, a user can check previous conversation contents with only one touch input and then enter message content.

Figure 6A:
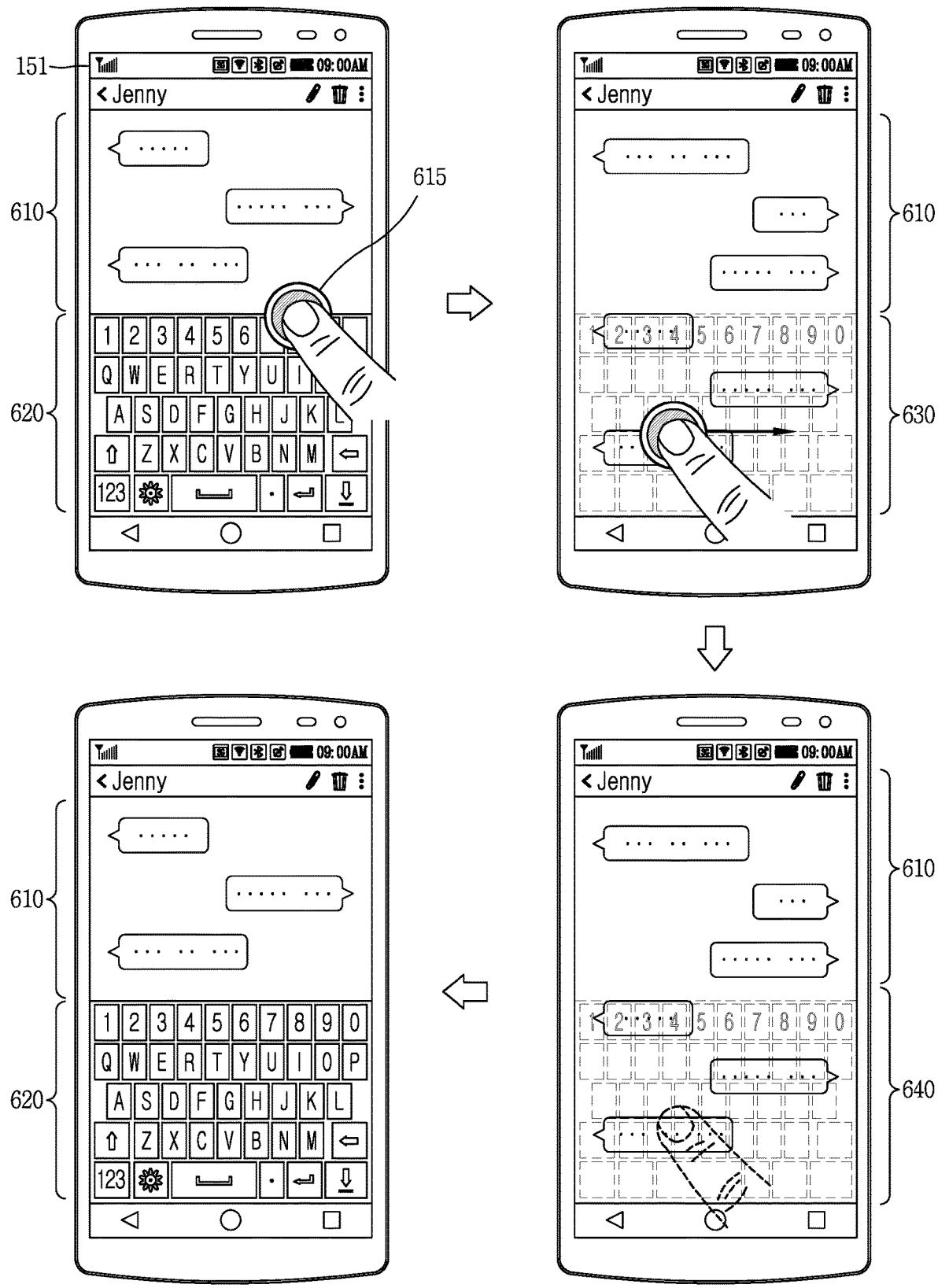

Next, FIG. 6A illustrates an embodiment of quickly checking desired content on a different conversation screen other than a current conversation screen while composing a message. Referring to FIG. 6A, when a drag touch input is applied in a preset direction, for example, horizontal direction, in a consecutive manner or within a reference period of time (for example, within 0.5 second) subsequent to releasing the touch input to the virtual keypad that becomes transparent as a touch input 615 exceeding a reference pressure is applied, it is changed to a content displayed on the display unit 151, namely, any one of another content selected based on a conversation screen with "Jenny", for example, any one of a previous/next conversation screen, a recently accessed conversation screen, and a user's frequently accessed conversation screen based on a current conversation screen.

For example, in FIG. 6A, it is seen that the remaining portion of the conversation screen with "Jenny" is switched to a conversation screen with "Tom". Furthermore, the controller 180 can switch the conversation screen 640 with "Tom" to another conversation screen according to the touch level, frequency, direction and the like of a drag touch consecutively applied to the virtual keypad.

In addition, as a drag touch input is applied in a top-down direction to the virtual keypad, the controller 180 can scroll a currently displayed conversation screen in a top-down direction to search desired information. When desired conversation content is checked on the virtual keypad as described above and then the touch input is released or a predetermined period of time (for example, 0.3~0.5 second) has passed subsequent to releasing the touch input, the controller 180 can switch the virtual keypad to a non-transparent one to proceed with a message composition. In other words, it is not required to perform an input (for example, a touch input to an input field region) for calling the virtual keypad again as in the related art.

Figure 6B:
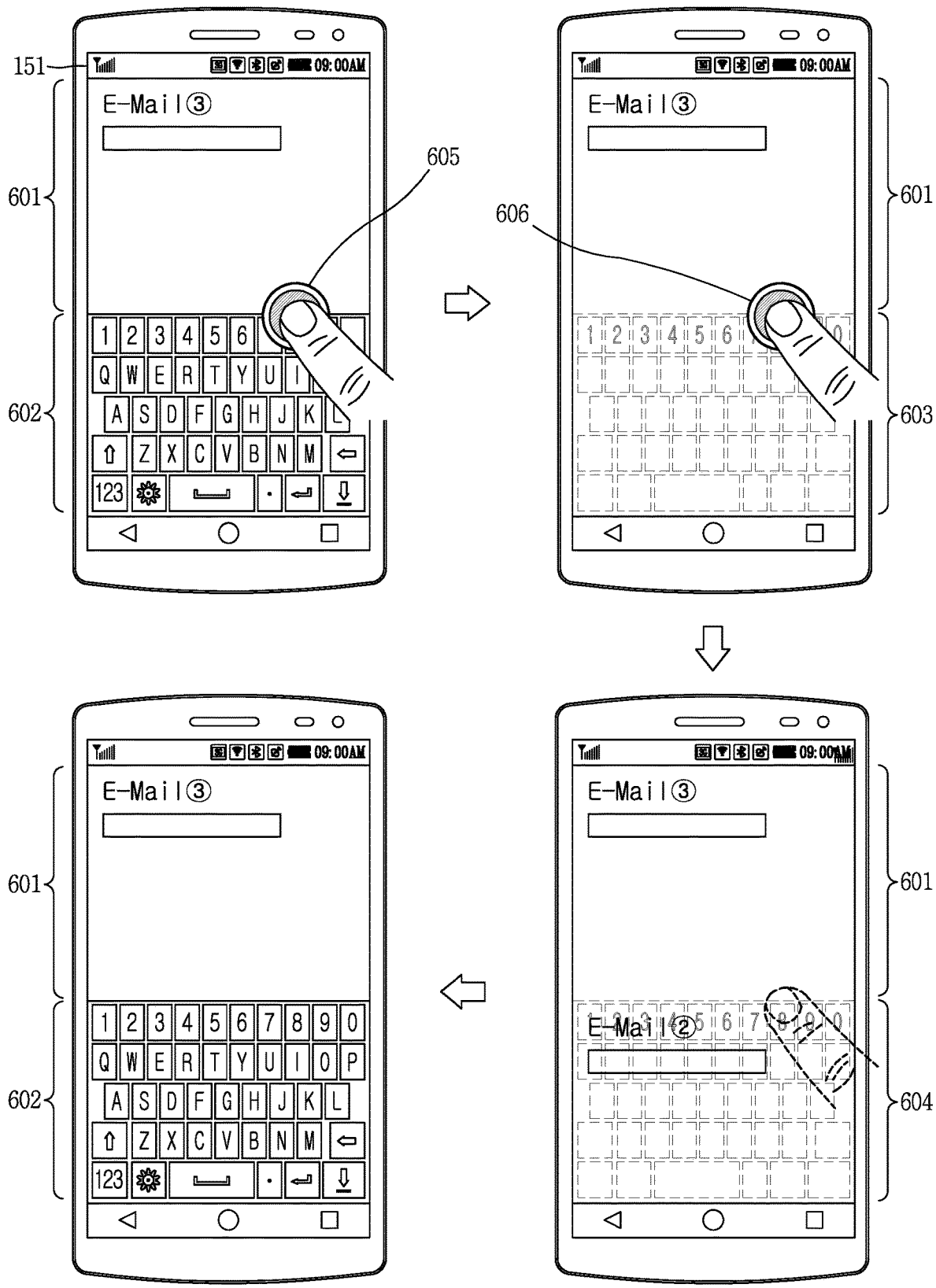

Further, FIG. 6B illustrates an exemplary method of consecutively applying touch inputs 605, 606 exceeding a reference pressure on the virtual keypad instead of the foregoing drag touch input to search desired information. As illustrated in FIG. 6B, whenever a touch input exceeding a reference pressure is applied to an upper frame of the virtual keypad (605, 606), an image exhibited on the virtual keypad is changed.

Specifically, the controller 180 can change an image exhibited on the virtual keypad to a different one according to a consecutive level of the touch input exceeding a reference pressure while continuously maintaining a first content displayed in a region out of the virtual keypad, namely, the display status of the e-mail compose screen 601.

Here, a criteria for changing an image may be different from that of the foregoing drag touch input. For example, regardless of the attribute of a currently composing e-mail screen, a recently received/transmitted e-mail may be automatically called. Then, when a touch input 606 applied to the virtual keypad is released, a user can proceed with an e-mail composition while the virtual keypad becomes non-transparent again.

Figure 7A:
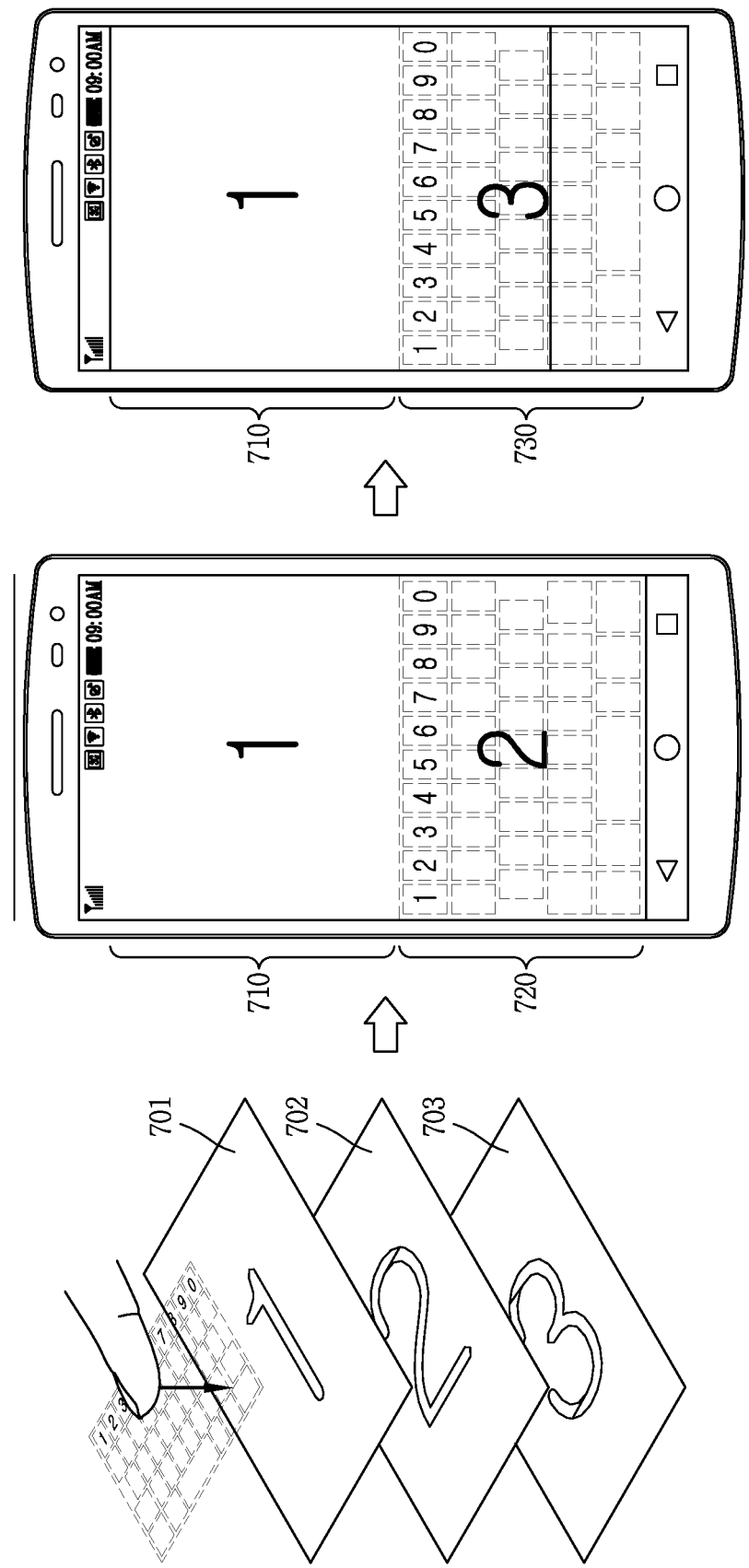
FIGS. 7A and 7B are conceptual views illustrating a method of varying a level of touch input to change a screen layered below in a mobile terminal according to an embodiment of the present disclosure.
Figure 7B:
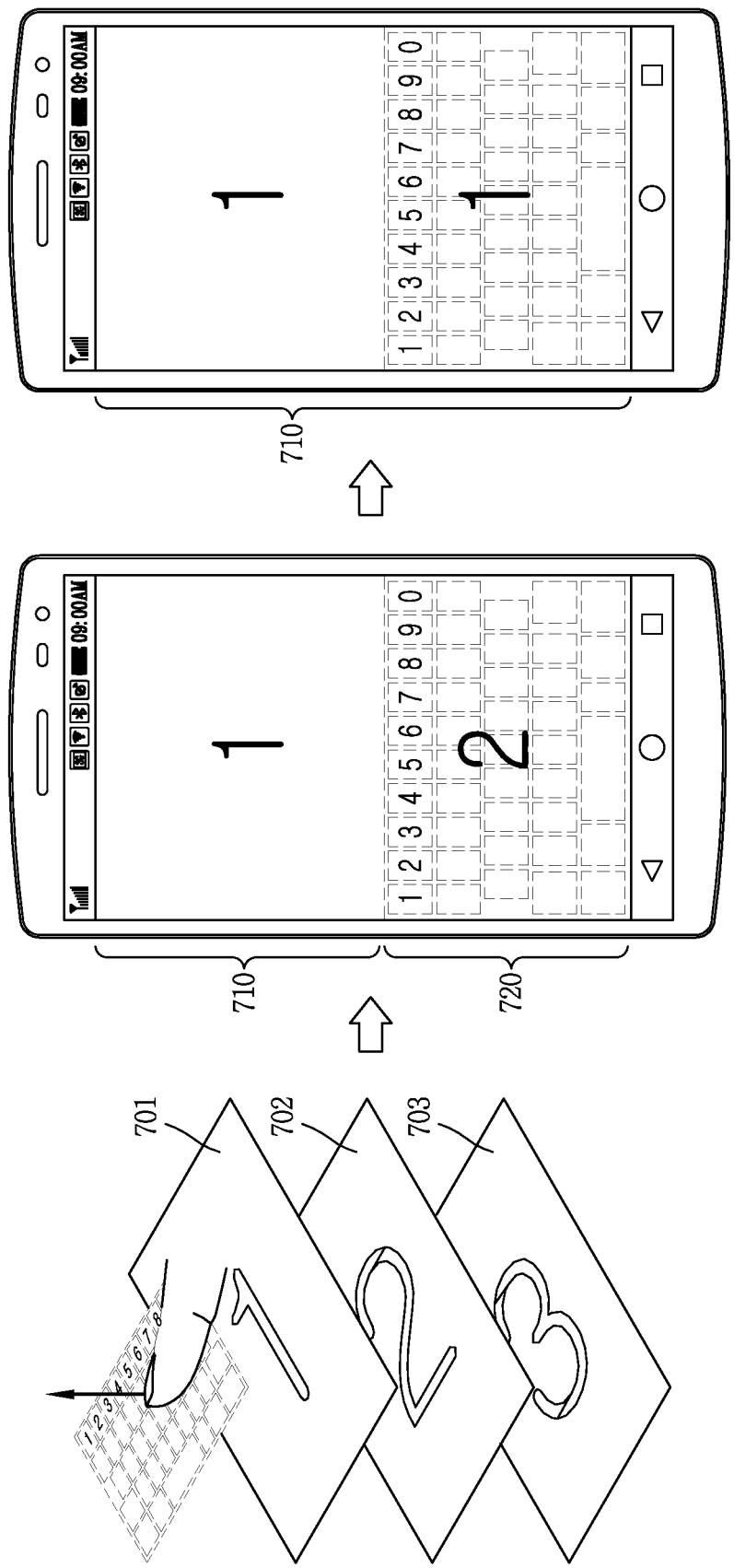

Next, FIGS. 7A and 7B are conceptual views illustrating a method of varying a level of touch input exceeding a reference pressure applied to the virtual keypad to change a screen layered below. According to an embodiment of the present disclosure, the controller 180 can differently select a content layered below to be displayed on the virtual keypad according to a touch level of the touch input exceeding a reference pressure applied to the virtual keypad.

For an example, as increasing a touch level of the touch input exceeding a reference pressure applied to the virtual keypad layered on the top when the execution screens 701, 702, 703 ("1", "2", "3") of a plurality of applications are layered as illustrated in FIG. 7A, it is possible to access an execution screen at a lower layer.

When the execution screens are layered in the order of "1", "2" and "3", the controller 180 can select any one or a plural number of "1", "2" and "3", in proportion to a touch level of the touch input to display them on the virtual keypad. For example, when a touch level of the applied touch input is a level capable of accessing the execution screen "3" layered at the bottom, the execution screen "3" can be immediately exhibited on a transparent virtual keypad (730) or the execution screens "1", "2" and "3" can be sequentially exhibited and then fixed to the execution screen "3". In other words, a user can increase a touch level of the touch input to deeply access an execution screen layered at a lower level.

Furthermore, the controller 180 can provide the location information of a layer of an execution screen exhibited on the virtual keypad or information on execution screens layered at a higher/lower level or a number of execution screens to the display unit 151. For example, the location of a current layer exhibited on the virtual keypad may be displayed (for example, hatched) within a plurality of overlapping rectangular images. Furthermore, the controller 180 can display the screen with a more increased transparency as the layer becomes deeper one by one according to the touch level, thereby briefly providing layer information to the user. Thus, the location information of a currently exhibited layer may be provided, thereby allowing a user to intuitively adjust a touch level for moving it to his or her desired layer location.

On the contrary, as illustrated in FIG. 7B, only a touch level of the touch input may be decreased when the touch input exceeding a reference pressure is not released to access an execution screen layered at a higher level again from a currently exhibited image. When the execution screens are layered in the order of "1", "2" and "3", the controller 180 can select any one or a plural number of "1", "2" and "3" in inverse proportion to a touch level of the touch input to display them on the virtual keypad.

For example, in case where a touch level of the initially applied touch input is a level capable of accessing the execution screen "2" layered at the middle, when the touch level decreases, the execution screen "2" (720) displayed on the virtual keypad is switched to the execution screen "1" (710). In other words, the touch level of the touch input may be decreased to get out of a lower layer to an execution screen layered above.

Thus, a touch level applied to the virtual keypad may be controlled to quickly access any one of a plurality of layered execution screens. Furthermore, a screen may be displayed along with a transparent virtual keypad to provide an emotional metaphor such as giving an actual depth to a plurality of layered execution screens.

Another embodiment may deeply access a lower content while maintaining the location of a current layer as a touch level of the touch input exceeding a reference pressure applied to the virtual keypad varies. Thus, the controller 180 can control an access level of a lower content associated with an image displayed on the virtual keypad active state a touch level of the touch input exceeding a reference pressure varies. For example, when a specific webpage is exhibited on a current virtual keypad, when a touch level of the touch input increases, it is possible to access a lower page of the webpage as the touch level of the touch input increases, and access a deeper lower page as increasing the touch level.

In the above, the embodiments of controlling and changing an execution screen exhibited on the virtual keypad have been described. Hereinafter, the examples of a method of quickly entering specific information contained in an execution screen exhibited on the virtual keypad to a current screen will be described.

Figure 8A:
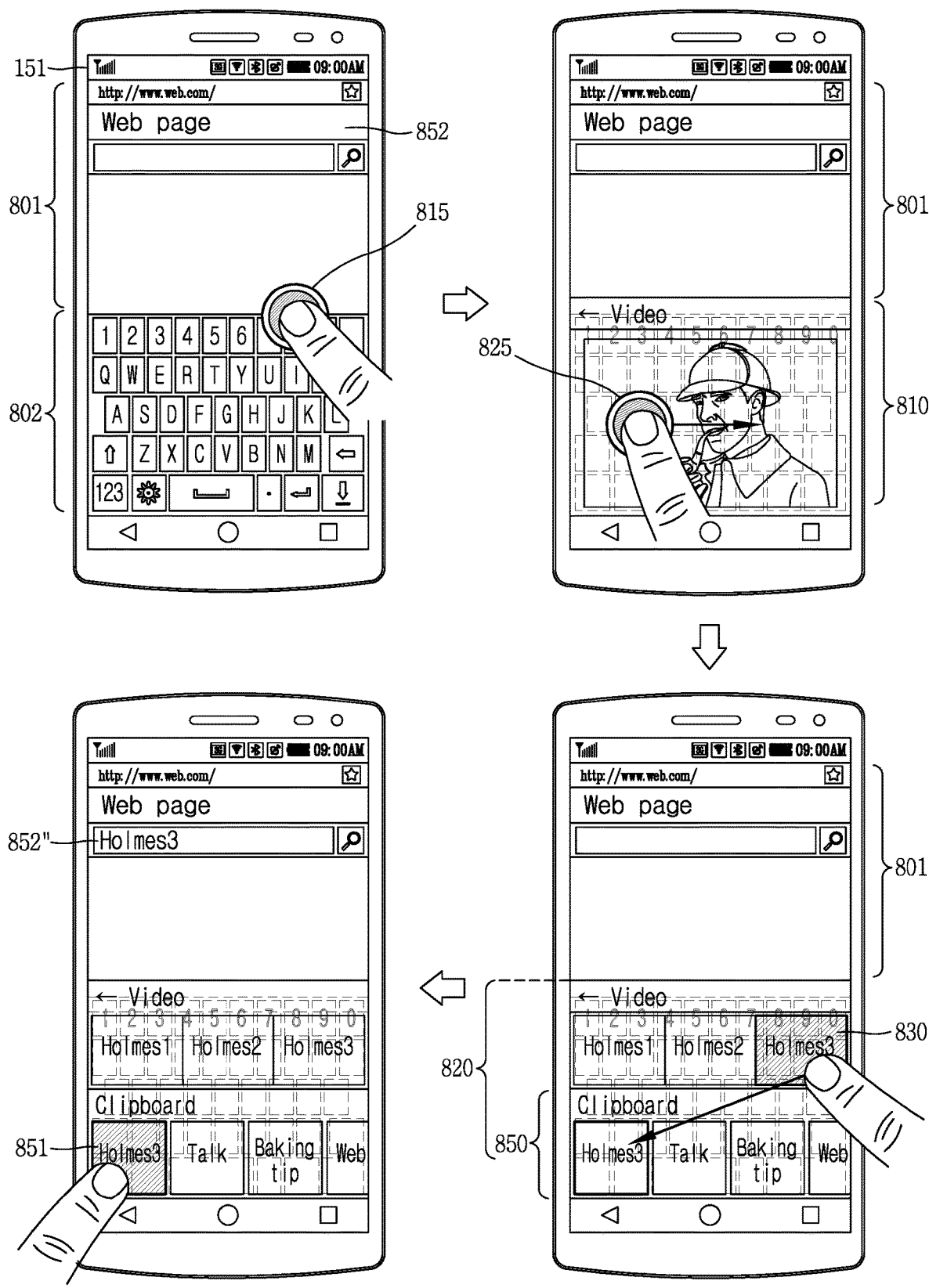
FIGS. 8A, 8B and 8C are various exemplary views illustrating a method of allowing an object contained in a screen layered below to be input to an input region in a mobile terminal according to an embodiment of the present disclosure.

According to an embodiment, as illustrated in FIG. 8A, when a specific object 830 is selected based on a touch input to an execution screen 820 exhibited on the virtual keypad, a clipboard region 850 for copying and pasting the selected object is displayed at a lower side of the virtual keypad.

Then, the controller 180 can enter a specific object to an input region of the current screen using the displayed clipboard region 850. Specifically, when the selected object 830 is dragged into the clipboard region 850, the controller 180 displays a copy of the selected object 830 in the clipboard region 850, and releases the selection display of the object 830 from the execution screen 820. Then, when a touch input is applied to the relevant object 851 displayed in the clipboard region 850, the controller 180 automatically enters the relevant object (Homes3) to a content screen on which it has been copied and displayed on the display unit 151, for example, the input field region 852 of the webpage 801 (852"). Furthermore, when a touch is subsequently applied to a search icon, the virtual keypad displayed on the clipboard region 850 disappears, and a search result is displayed on the display unit 151.

Figure 8B:
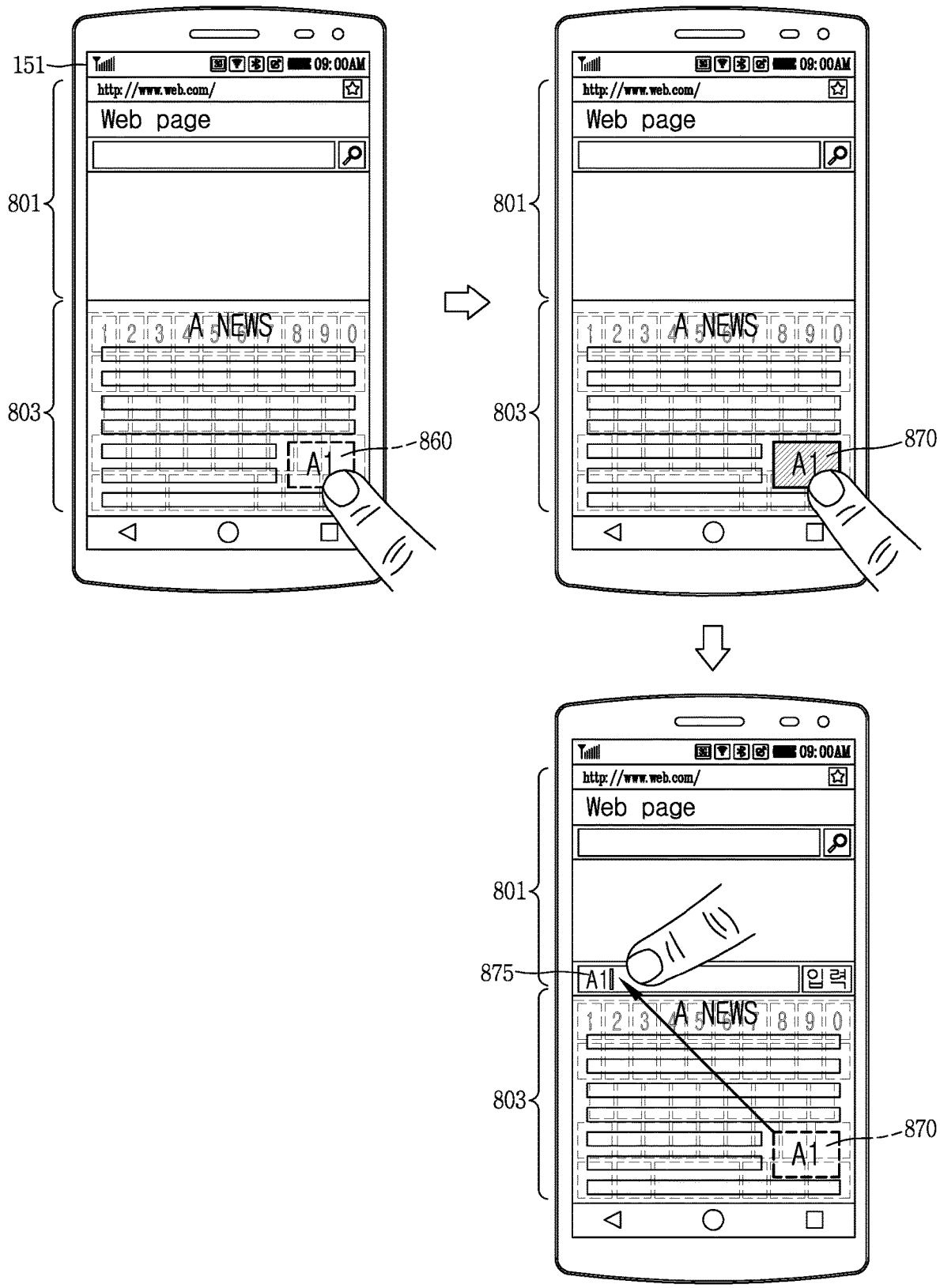

In another example, as illustrated in FIG. 8B, a touch input exceeding a reference pressure may be applied to an execution screen 803 at a lower level exhibited on the virtual keypad to select a specific object (A1) 860. When a specific object is selected and then a touch level of the touch input is decreased, the controller 180 moves and displays the selected object on the uppermost layer like an object floating on the water. Accordingly, an image of the virtual keypad is no more displayed in an overlapping manner in a region displayed with the selected object, but only the object is displayed (870).

Then, the controller 180 can automatically enter a copy of the relevant object 870 to an input region 875 in response to a touch input dragged to the input region 875 of the virtual keypad being applied to the object displayed on the uppermost layer. Alternatively, as illustrated in FIG. 8C, the selected specific object (A1) 860 may be directly dragged to an input field region of the displayed webpage 801 to be input to the relevant region (878).

Figure 8C:
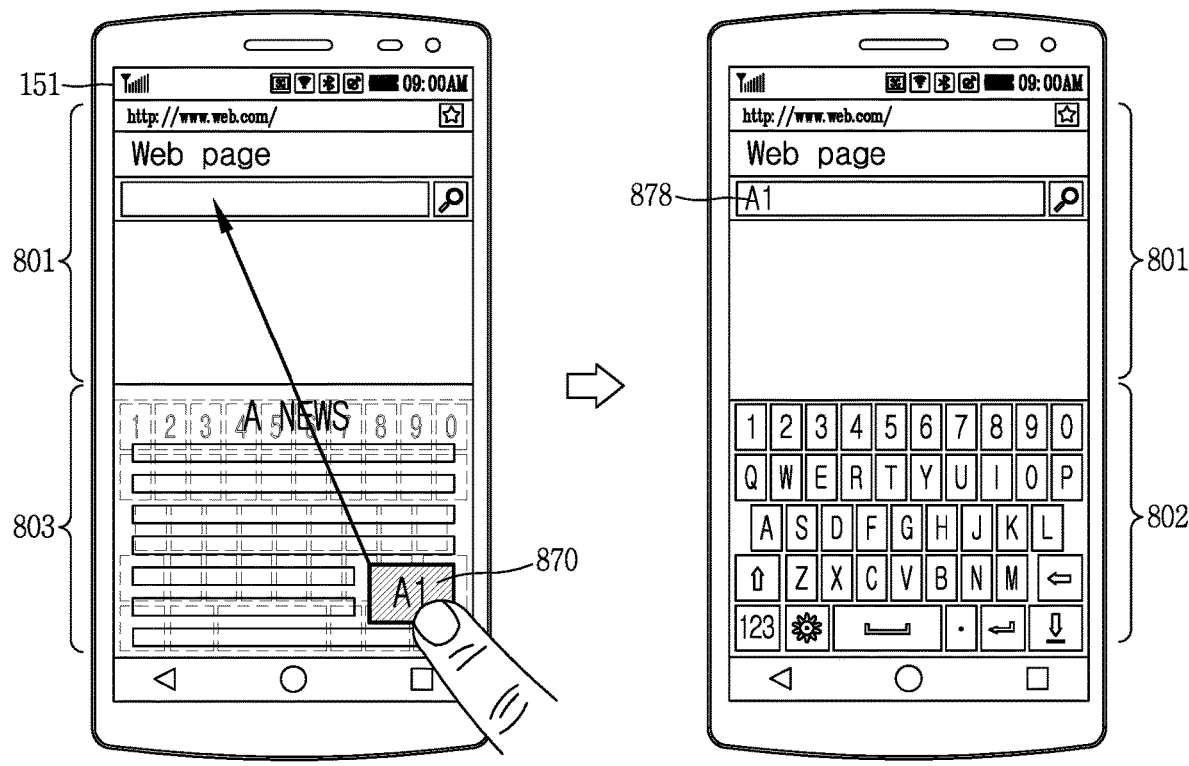

At this time, as illustrated in FIGS. 8B and 8C, though the selected object (A1) is copied and the copied one is created on a current layer in actuality, it is visually seen that information displayed on another layer seems to move between layers. Furthermore, when an object (A1) is input to the input field region, the virtual keypad becomes non-transparent again, and an execution screen layered below disappears. At this time, it is possible to provide a visual effect of allowing an execution screen layered below to gradually disappear while the virtual keypad gradually becoming non-transparent. Accordingly, it provides a real metaphor such as allowing an object floating on the water to go into the water when pressed by hand and then come out of the water when released from hand.

As described above, according to an embodiment of the present disclosure, a screen may be controlled to display a specific object displayed on a lower layer exhibited on the virtual keypad in an input region of a current layer. Accordingly, it is possible to provide visual fun and convenience of manipulation such as allowing a specific object to freely move between a plurality of layers.

In the above, an example of selecting an execution screen layered below according to a touch level of the touch input exceeding a reference pressure has been described. Hereinafter, the examples of a method of selecting an execution screen layered below based on a position to which a touch input exceeding a reference pressure is applied will be described in detail.

Figure 9A:
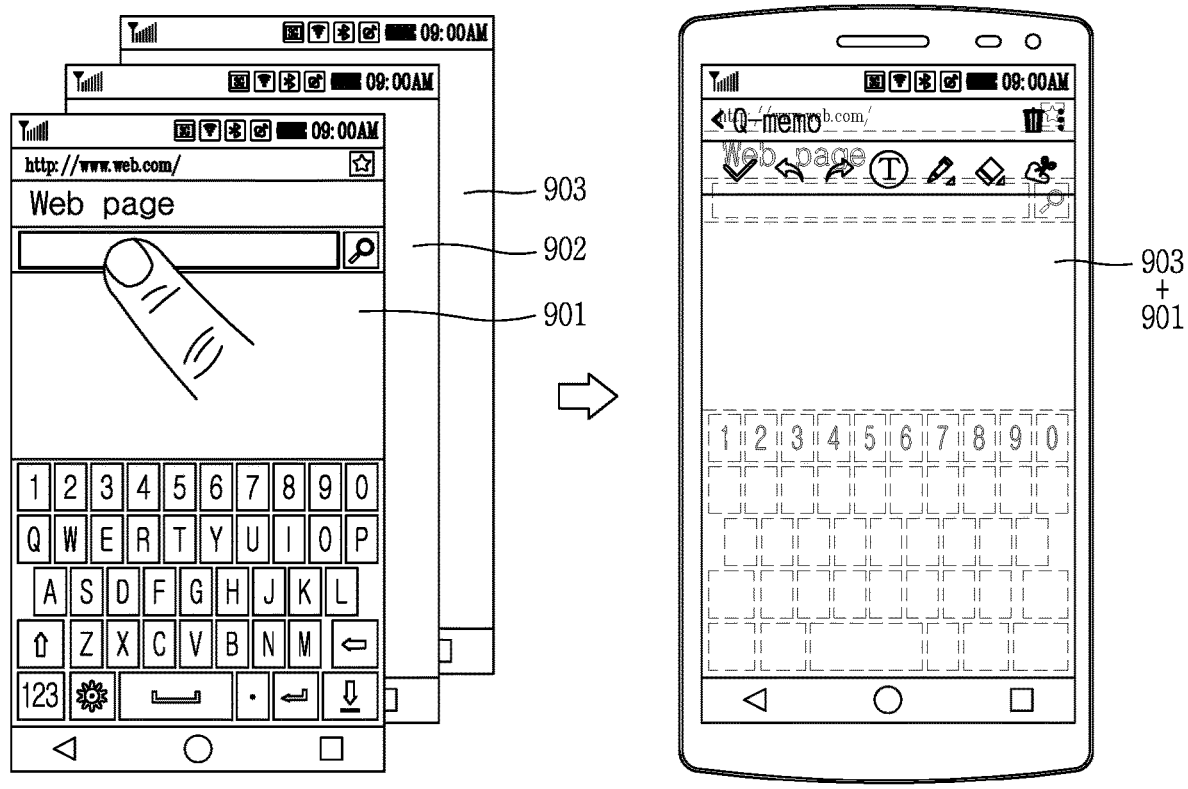
FIGS. 9A and 9B are exemplary views illustrating a method of selecting a screen layered below in a different manner according to the position of a touch input in a mobile terminal according to an embodiment of the present disclosure.
Figure 9B:
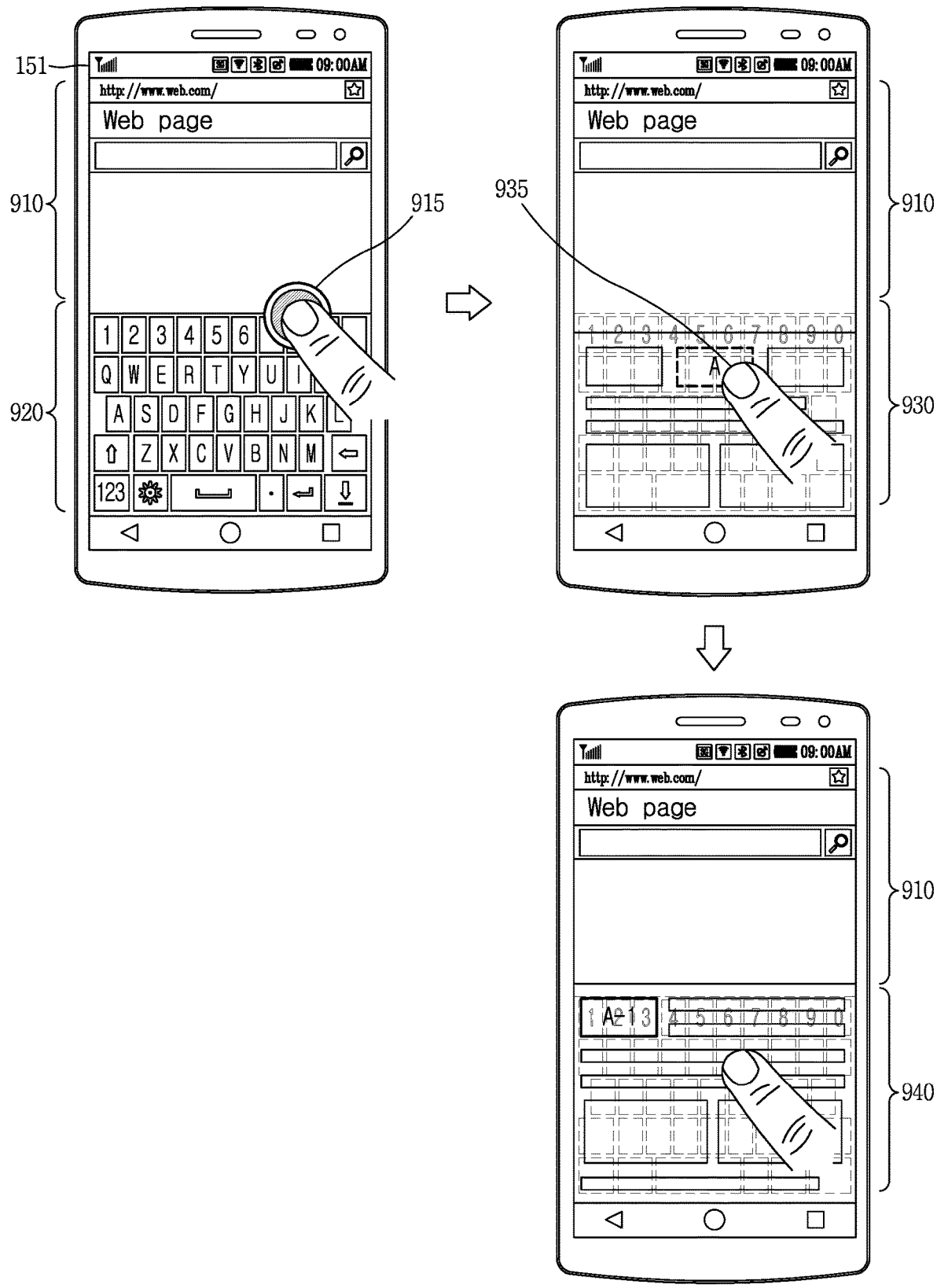

In this regard, FIGS. 9A and 9B are exemplary views illustrating a method of selecting a screen layered below in a different manner according to the position of a touch input. For example, in FIG. 9A, an e-mail execution screen 902, a Q-memo execution screen 903 from a currently displayed webpage 901 are layered in the order. Here, when a touch input exceeding a reference pressure is applied to an input field region of the webpage 901 other than the virtual keypad, the controller 180 can increase the transparency of the webpage 901 and the virtual keypad at the same time, and display an execution screen associated with the input field region, namely, a Q-memo execution screen 903 in which input information associated with the input field region exists regardless of the layered order (903+901).

Thus, the controller 180 preferentially selects a plurality of execution screens layered below, namely, an execution screen associated with information displayed at a position to which a touch input is applied among the e-mail execution screen 902, Q-memo execution screen 903, and the like. In other words, execution screens layered below are not selected according to a touch level of the touch input applied to the input field region of the webpage 901. At this time, a drag touch input or flicking touch input may be applied in a horizontal direction to the displayed screens (903+901), thereby changing the Q-memo execution screen 903 exhibited on the display unit 151 to the e-mail execution screen 902 or another screen.

For another embodiment, FIG. 9B is an embodiment of changing an execution screen 930 in a different manner according to the position of a consecutively applied touch input on the execution screen 930 exhibited according to a touch input exceeding a reference pressure applied to the virtual keypad 920. For example, in FIG. 9B, when a touch input exceeding a reference pressure is applied to a specific region 935 of the execution screen 930, the controller 180 selects an execution screen (A-1) 940 associated with information "A" displayed on the specific region 935 to which a touch input is applied among a plurality of execution screens layered below.

For example, when the attribute of "A" is an image, an execution screen associated with an image such as gallery, video, TV and the like among execution screens layered below may be preferentially selected. Alternatively, for example, an execution screen including the same text/image as "A" or an execution screen having a high correlation with "A" may be preferentially selected. In the above, an embodiment of allowing an image layered below to automatically disappear while increasing the transparency of the virtual keypad when a touch input applied to a transparent virtual keypad is released or a predetermined period of time has passed subsequent to the release has been described.

Figure 10:
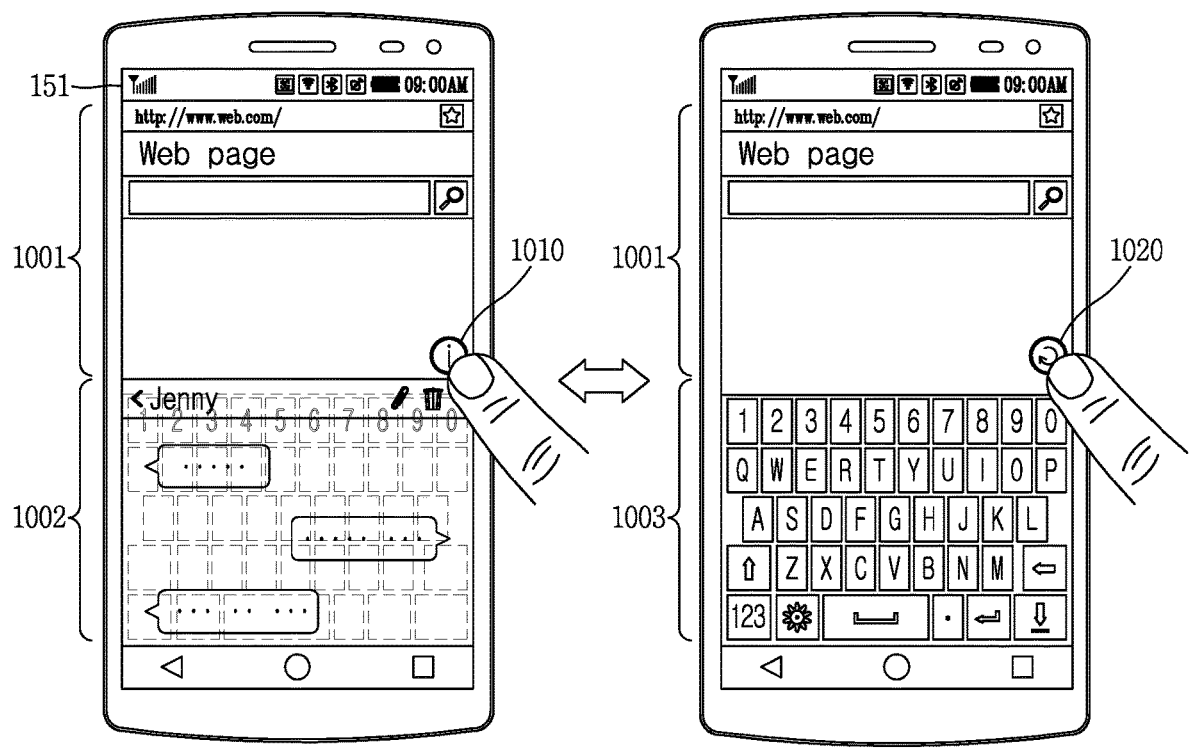
FIG. 10 is an exemplary view illustrating a method of controlling a screen layered below exhibited on a keypad to disappear or reappear using an icon in a mobile terminal according to an embodiment of the present disclosure.

However, according to another example, as illustrated in FIG. 10, the transparency of the virtual keypad can be immediately switched to a non-transparent state or switched to a previous state again using icons 1010, 1020. Thus, when the transparency of the virtual keypad is increased and a screen layered below is exhibited as a touch input exceeding a reference pressure is applied, the controller 180 of the mobile terminal 100 can generate a first icon 1010 in one region of the display unit.

The first icon 1010 is illustrated as an indicator "i" on the right of the virtual keypad in FIG. 10, and is not limited to this position and shape and various modifications are available. Then, when a touch input is applied to the first icon 1010, the controller 180 can decrease the transparency of the virtual keypad (for example, the transparency is adjusted to "0"), and control an execution screen 1002 exhibited on the virtual keypad to disappear. At the same time, the first icon 1010 is changed to a second icon 1020 having a different shape.

In addition, when a touch input is applied again to the changed second icon 1020, a most recently exhibited image is shown again on a transparent virtual keypad while increasing the transparency of the virtual keypad again. In other words, either one of a state of the left image and a state of the right image in FIG. 10 may be easily switched to another one by a touch input to the icons 1010, 1020.

Figure 11:
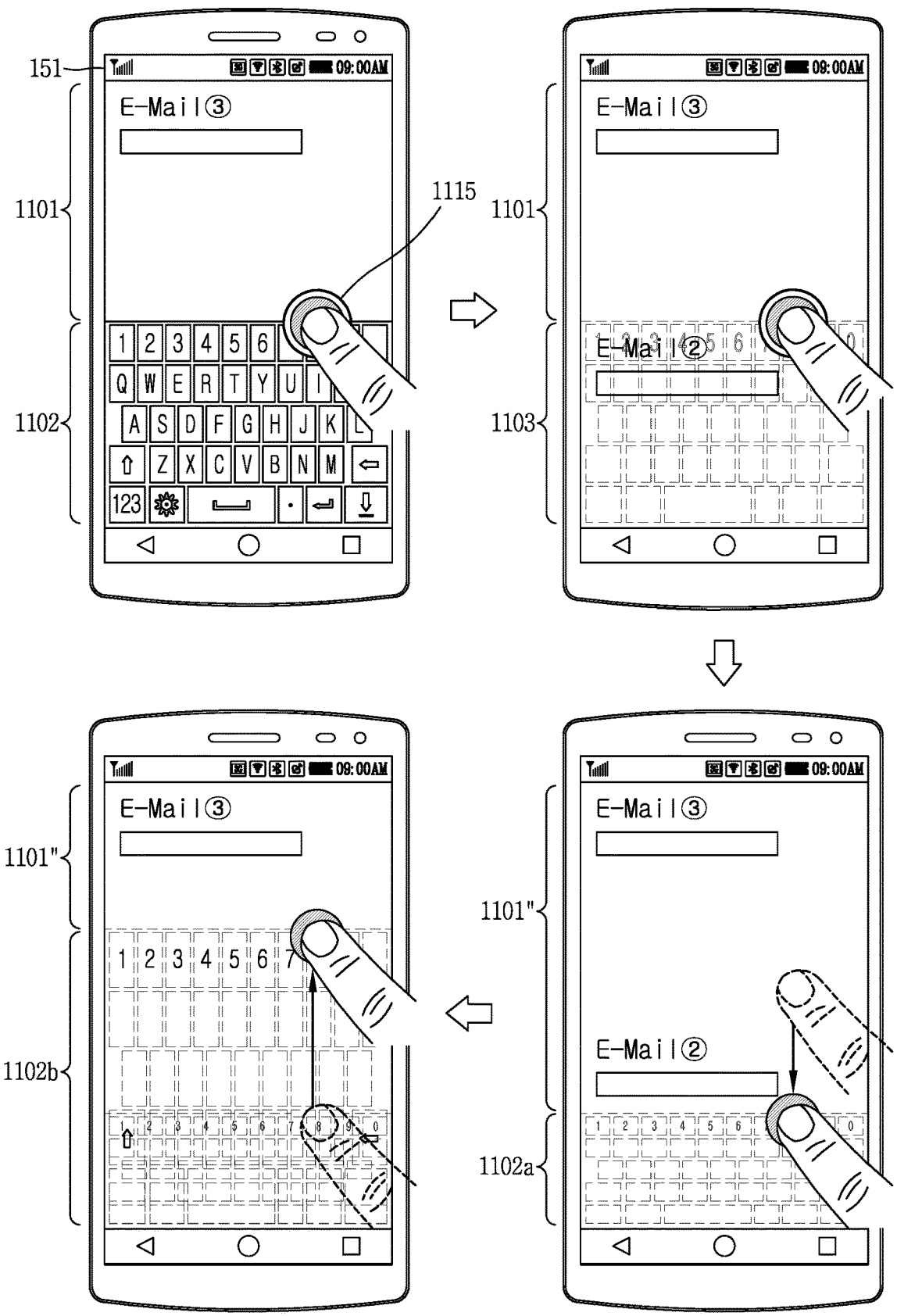
FIG. 11 is a view illustrating an example of a method of adjusting the height of a virtual keypad using a touch input in a mobile terminal according to an embodiment of the present disclosure.
Figure 12:
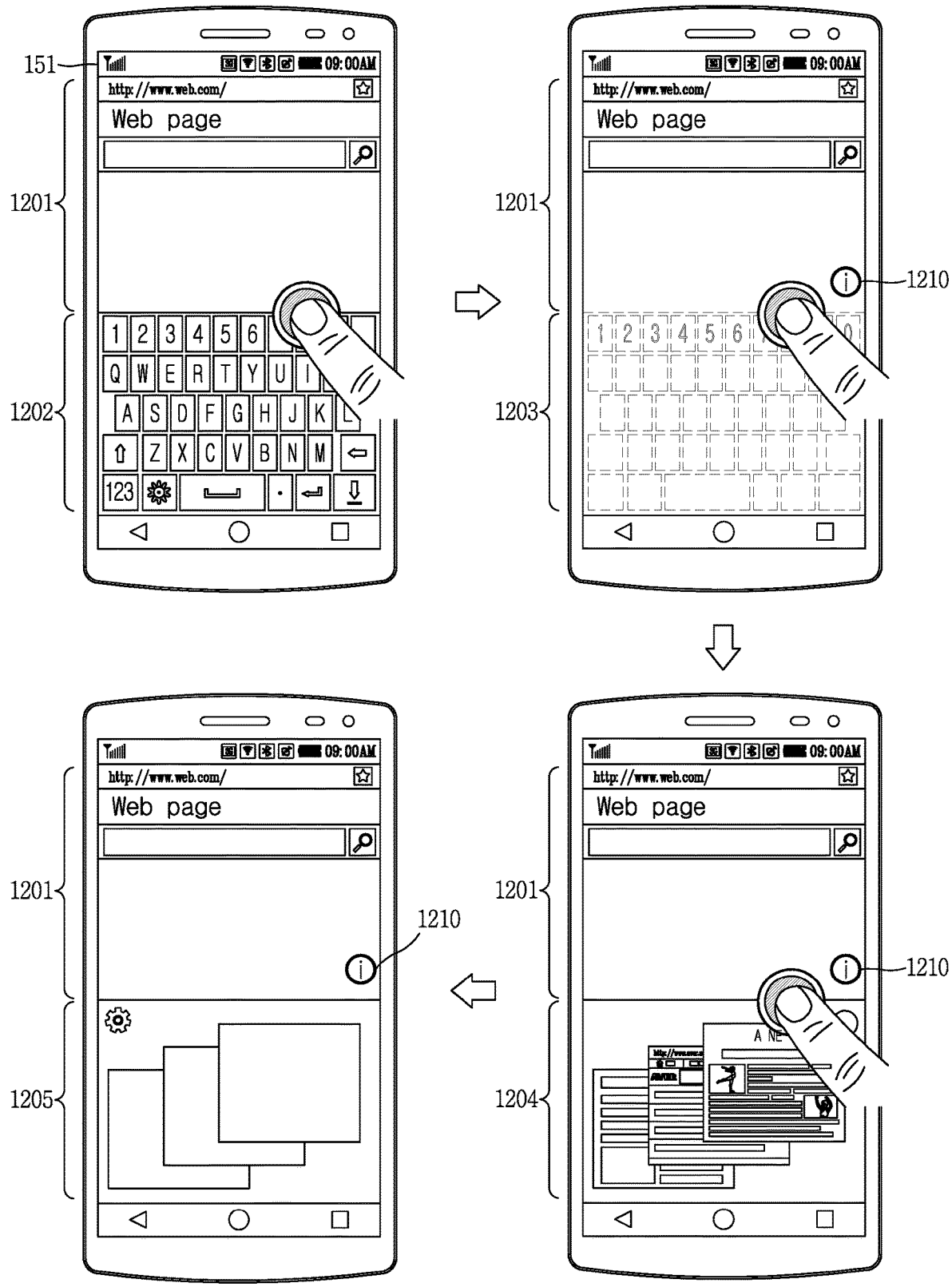
FIG. 12 is a view illustrating an example of a method of entering a setting mode for a virtual keypad according to a level of touch input in a mobile terminal according to an embodiment of the present disclosure.
Figure 13:
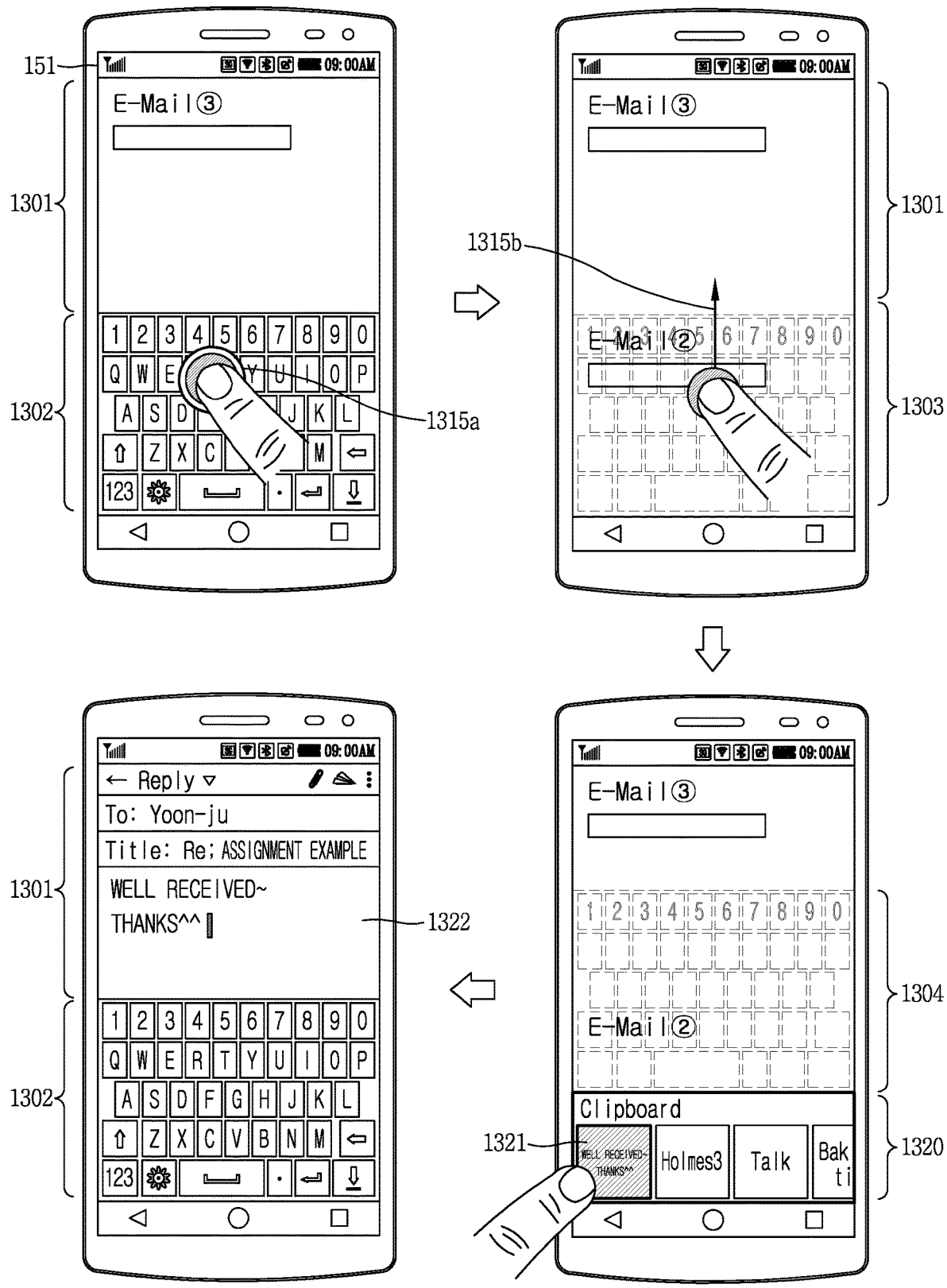
FIG. 13 is a view illustrating an example of a method of calling a clipboard using a touch input in a mobile terminal according to an embodiment of the present disclosure.

Next, FIGS. 11, 12 and 13 illustrate an example of changing the setting of a virtual keypad itself, changing an input method or quickly calling a menu associated with the virtual keypad using a touch input applied to a transparent virtual keypad. Information layered below cab be checked or dragged to a current screen while entering information using the virtual keypad as described above, and includes changing a setting for the virtual keypad itself or call a menu associated therewith.

For example, changing a first keypad (English layout keyboard) to a second keypad (Korean layout keyboard) having a different key layout can be easily performed through a touch input to the keypad. However, for a change of settings associated with a keyboard, for example, a keyboard type (for example, QWERTY keyboard, Chunjiin keyboard, Vega keyboard, etc.), a basic language (English, Japanese, Chinese, Korean, French, etc.), a size of keyboard, and the like, there is an inconvenience in that a user should enter a setting application of the mobile terminal 100 and then undergo several steps.

Accordingly, the present disclosure presents a method of changing settings such as a size of keypad, a keyboard type, a basic language or easily calling a menu associated therewith while checking information layered below the keypad to facilitate an input environment using the keypad.

First, FIG. 11 illustrates an example of a method of controlling the height of the virtual keypad itself. As illustrated in FIG. 11, when a touch input 1115 exceeding a reference pressure is applied to an upper frame of the virtual keypad 1102 when the virtual keypad 1102 is displayed at a lower side of the display unit 151, a screen layered below is exhibited on the virtual keypad while increasing the transparency of the virtual keypad (1103).

In this state, when the frame is dragged downward or upward when the touch input 1115 applied to an upper frame of the virtual keypad 1102 is maintained, the controller 180 can control the height of the virtual keypad in a top-down direction along the dragged direction. For example, when the touch input 1115 is dragged downward, the height of the virtual keypad decreases in proportion to the dragged length. Furthermore, when the touch input 1115 is dragged upward, the height of the virtual keypad increases in proportion to the dragged length.

At this time, even while the height of the virtual keypad is controlled, the transparency of the virtual keypad and the display of a screen layered below are maintained. Furthermore, when the height of the virtual keypad decreases, part of the screen layered below is exposed by getting out of the virtual keypad. Similarly to this, when the height of the virtual keypad increases, part of the email compose screen 1101 overlaps with the height increased virtual keypad. When the touch input 1115 is released subsequent to adjusting the virtual keypad to a user's desired height, it is possible to enter characters using a height adjusted virtual keypad while decreasing the transparency of the virtual keypad.

Next, FIG. 12 is an example of changing the setting of an input method of the virtual keypad on a current screen without entering a setting application. Thus, the controller 180 can increase the transparency of the virtual keypad, and control a setting screen to be exhibited on a transparent virtual keypad in response to a touch input exceeding a reference pressure consecutively applied to a boundary region of the virtual keypad.

Referring to FIG. 12, when a touch input exceeding a reference pressure is initially applied to a boundary region of a virtual keypad 1201, for example, an upper frame of the virtual keypad 1202 when a webpage 1201 and the virtual keypad 1202 are displayed on the display unit 151, part of the webpage 1201 is exhibited on the virtual keypad while increasing the transparency of the virtual keypad (1203). At this time, an icon 1210 for returning to a previous screen, namely, a state in which only the virtual keypad is displayed (1202), may be generated in one region of the display unit 151.

In this state, when a touch input exceeding a reference pressure is consecutively applied to an upper frame of the virtual keypad 1202, it is possible to enter a setting mode for the virtual keypad. Accordingly, a setting screen associated with the virtual keypad is exhibited on a transparent virtual keypad.

When enters a setting mode associated with the virtual keypad as described above, a designated color may be displayed or a highlighting effect may be output in a region displayed with the transparent virtual keypad to distinguish it from a case where the foregoing execution screen layered below is exhibited. Accordingly, a user can intuitively recognize having entered a setting mode for the virtual keypad.

Here, the setting screen may be exhibited in the form of a plurality of selectable layered pages as illustrated in FIG. 12. Furthermore, the plurality of layered pages may be the setting screens of different keyboard types (for example, QWERTY keyboard, Chunjiin keyboard, Vega keyboard, etc.), for example. The user can select a keyboard type desired to be changed through a drag touch input, and when the generated icon 1210 is touched, a screen is displayed in a changed keyboard type.

Furthermore, when a touch input exceeding a reference pressure is applied once more to an upper frame of the virtual keypad 1202, a plurality of selectable layered pages may be switched to a different type of setting screen, for example, a setting screen for changing a basic language (for example, changing to English, Japanese, Chinese, Korean, French, etc.)

However, though setting screens for the virtual keypad are displayed in a plurality of layered pages in FIG. 12, the present disclosure is not limited to this, and displayed as the same image as that of a screen exhibited on a setting application or displayed in a scroll method, a function on/off method, and other different forms.

Next, FIG. 13 illustrates an exemplary view of calling a clipboard as an example of a menu associated with the virtual keypad. Specifically, when a touch input exceeding a reference pressure is applied to the displayed virtual keypad 1302 in FIG. 13, a virtual keypad with a transparent execution screen layered below is exhibited while the virtual keypad becomes transparent.

Here, when a touch gesture for flicking the touch input in one direction, for example, in an upward direction, the controller 180 moves the transparent virtual keypad along a dragged direction (1304). Then, a clipboard region 1320 for obtaining stored information is exhibited at a lower end side of the display unit 151. Accordingly, a user can use the clipboard region 1320 at the same time in addition to the virtual keypad as a means of information input.

When desired information is selected from the clipboard region 1320 (1321), the selected information is automatically input to an input region of the email compose screen 1301. Then, when the clipboard region 1320 disappears, the user can subsequently perform email composition using the virtual keypad 1302 (for example, additional information input, etc.).

However, when a touch gesture for flicking a touch input exceeding a reference pressure applied to the virtual keypad 1302 in a different direction, for example, downward direction, is applied, the controller 180 moves the transparent virtual keypad along a dragged direction (1304). Then, a different menu associated with an input, for example, stored note, notepad, or the like, may be displayed on the transparent virtual keypad.

Further, in the above, various embodiments associated with a case where a touch input exceeding a reference pressure is applied to a virtual keypad or a boundary region of the virtual keypad have been described. Hereinafter, the detailed operation of the mobile terminal 100 in case where a touch input exceeding a reference pressure is applied to a region out of the virtual keypad will be described.

Figure 14:
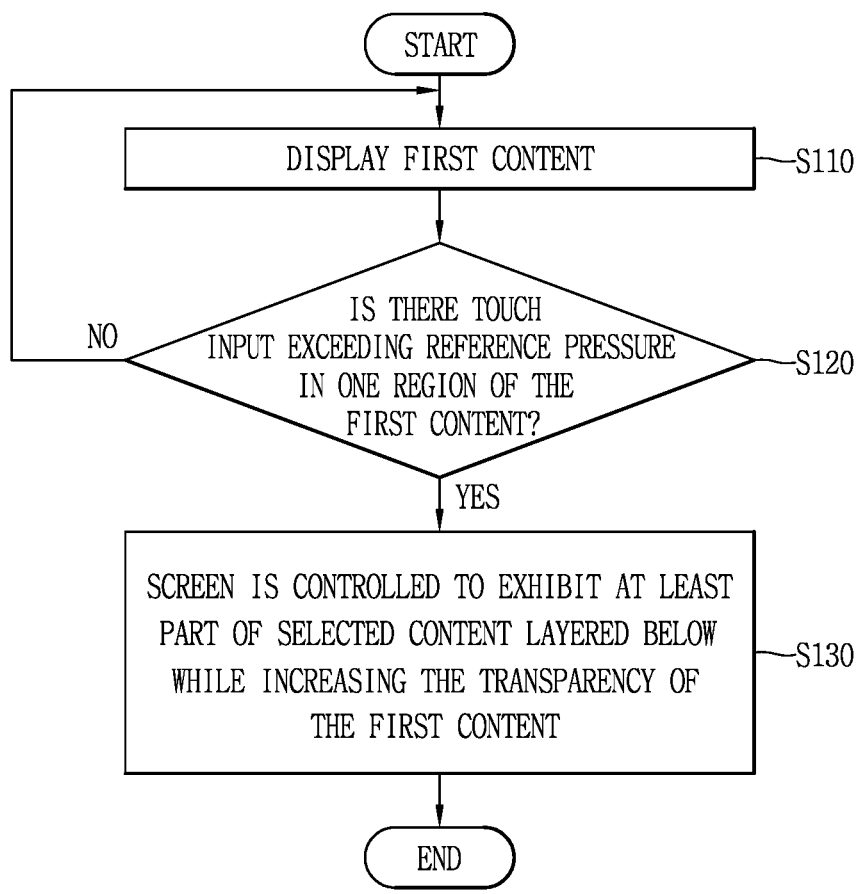
FIG. 14 is a flow chart illustrating another exemplary operation implemented in a mobile terminal according to an embodiment of the present disclosure.

FIG. 14 illustrates an operational flow of the mobile terminal 100 associated therewith. First, the controller 180 displays a first content on the display unit 151 of the mobile terminal 100 (S110). Here, the type of the first content has no limitation, and for example, a home screen, a specific webpage, an execution screen of an SNS application, an execution screen of a financial application, or the like may be the first content. Furthermore, the first content may include at least one input field region.

Next, when a touch input exceeding a reference pressure is sensed from one region of the displayed first content (Yes in S120), the controller 180 recognizes a position to which the touch input is applied, and selectively displays any one of execution screens layered below along with the first content while increasing the transparency of the first content based on this touch input (S130).

Here, when there is one execution screen layered below, the relevant execution screen is displayed along with a transparent first content. On the contrary, where there are a plurality of execution screens layered below, any one of different execution screens may be selected according to information displayed at a position to which the touch input is applied.

Specifically, the controller 180 can select a second content, which is any one of contents layered below, based on a level associated with information displayed in a region to which the touch input is applied. Furthermore, when a touch input is applied to the display unit 151, the controller 180 can limit an input of a control command to the first content with an increased transparency, and recognize it as an input of a control command to a second content.

Furthermore, when a specific object is selected from a second content based on a touch input, the controller 180 automatically enters the selected object to an input field region of a transparent first content. In other words, while the first and the second content are displayed at the same time, an input to the first content may be limited, but the display thereof may not be limited.

Figure 15:
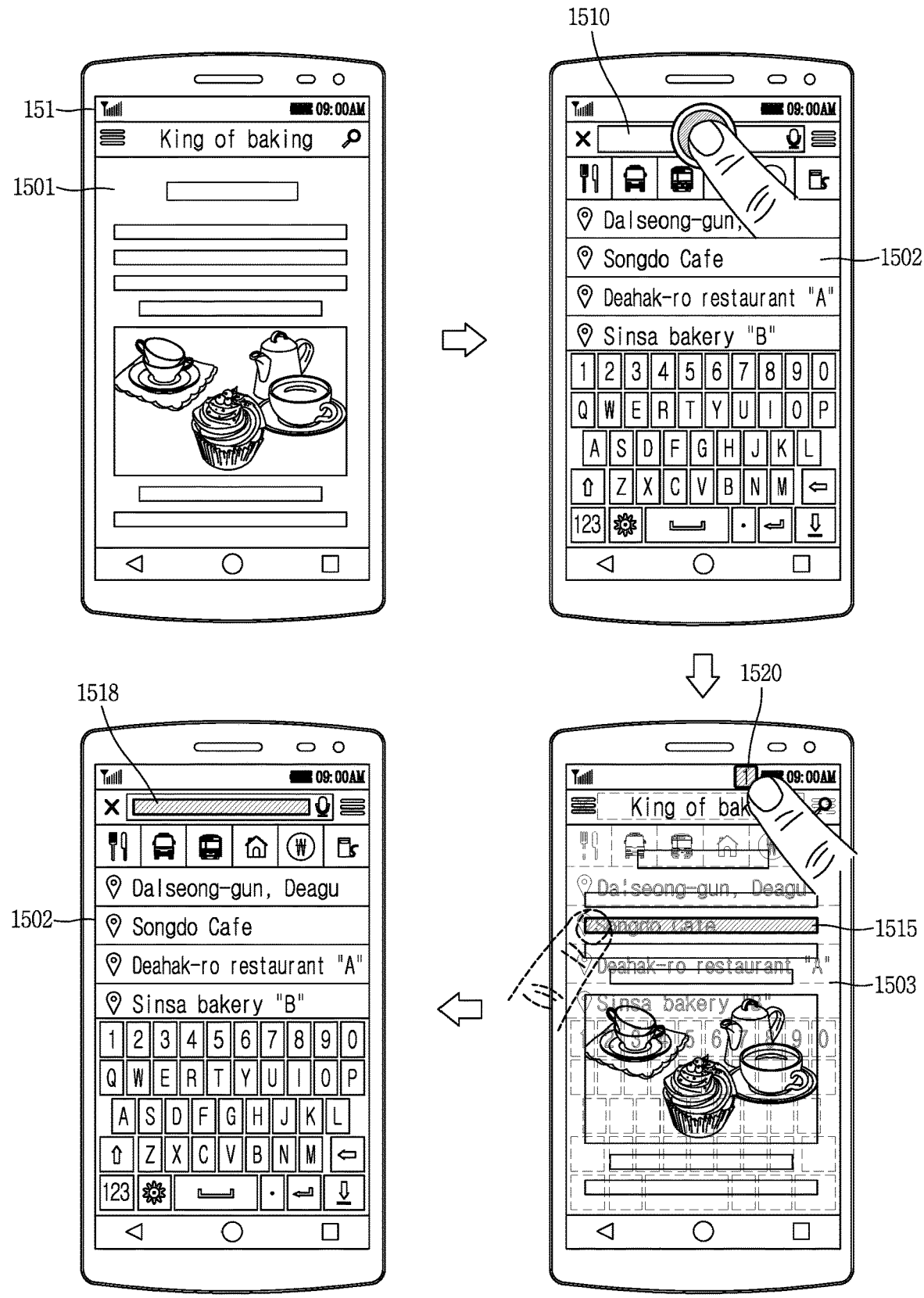
FIG. 15 is a view illustrating an example of a method of selecting a screen layered below and obtaining information from the selected screen according to the position of a touch input in a mobile terminal according to an embodiment of the present disclosure.

With regard to this, FIG. 15 illustrates an example of a method of selecting a screen layered below and obtaining information from the selected screen according to a position of the touch input. Referring to FIG. 15, for example, a web application is executed on the mobile terminal 100 to view a specific blog page 1501 through the display unit 151, and then a map application is executed to display a map search screen 1502.

Here, when a user wants to enter an address displayed on the blog page 1501 that has been previously viewed to search a map, the present disclosure allows the operation of his or her desired address input on a current screen without screen switching. Specifically, when a touch input exceeding a reference pressure is applied to an "address" input field region 1510 of the map search screen 1502, an execution screen including address information (for example, information including land-lot number, IPO, road name address, and the like) among execution screens layered below is exhibited while increasing the transparency of a current screen 1502.

At this time, the controller 180 can perform an automatic scroll and then display associated information, namely, address information, on an execution screen layered below to be preferentially exhibited. Furthermore, when an execution screen layered below is exhibited while increasing the transparency of the current screen 1502 as described above, an icon 1520 for changing it to a previous display status of the map search screen 1502 may be generated in the vicinity of one region of the display unit 151, for example, a region to which a touch input exceeding a reference pressure is applied.

Furthermore, when there are a plurality of execution screen layered below, the controller 180 can recognize information displayed at a position to which a touch input exceeding a reference pressure is applied or the attribute of the relevant region (here, the attribute of the input field region) on a current screen, and controls an appropriate execution screen to be selectively exhibited. Here, when the exhibited execution screen is not a desired page, for example, a touch input exceeding a reference pressure may be consecutively applied to the same position to change it to another execution screen.

When execution screens are displayed in an overlapping manner as described above, the controller 180 limits an input of a control command according to the touch input as an input to an execution screen layered below exhibited on a current screen. In other words, an input of a control command to a transparent current screen is limited.

Next, when desired address information is selected from the blog page 1501 based on a drag touch input, the controller 180 recognizes the selected information to automatically generate a copy. Then, when the displayed icon 1520 is touched, a copy of information selected from the blog page 1501 is automatically pasted to the "address" input field region 1510 while the display status of the map search screen 1502 is changed to an original state (1518).

Further, In another example, a touch input exceeding a reference pressure may be applied to any position other than the input field region. In this instance, the controller 180 can select an execution screen layered below based on information displayed at the touched position. Moreover, when an object is selected from an execution screen exhibited on a current transparent screen, the controller 180 can merely copy the selected object or automatically enter the selected copy to an initially displayed input field region regardless of the touched position.

In the above, the embodiments of a case where a plurality of execution screens are displayed in an overlapping manner on the entire display unit 151 have been described, Here, when the execution screens have a lot of texts or images, it may occur a case where the identification of texts or images on the overlapping portion is difficult.

Figure 16A:
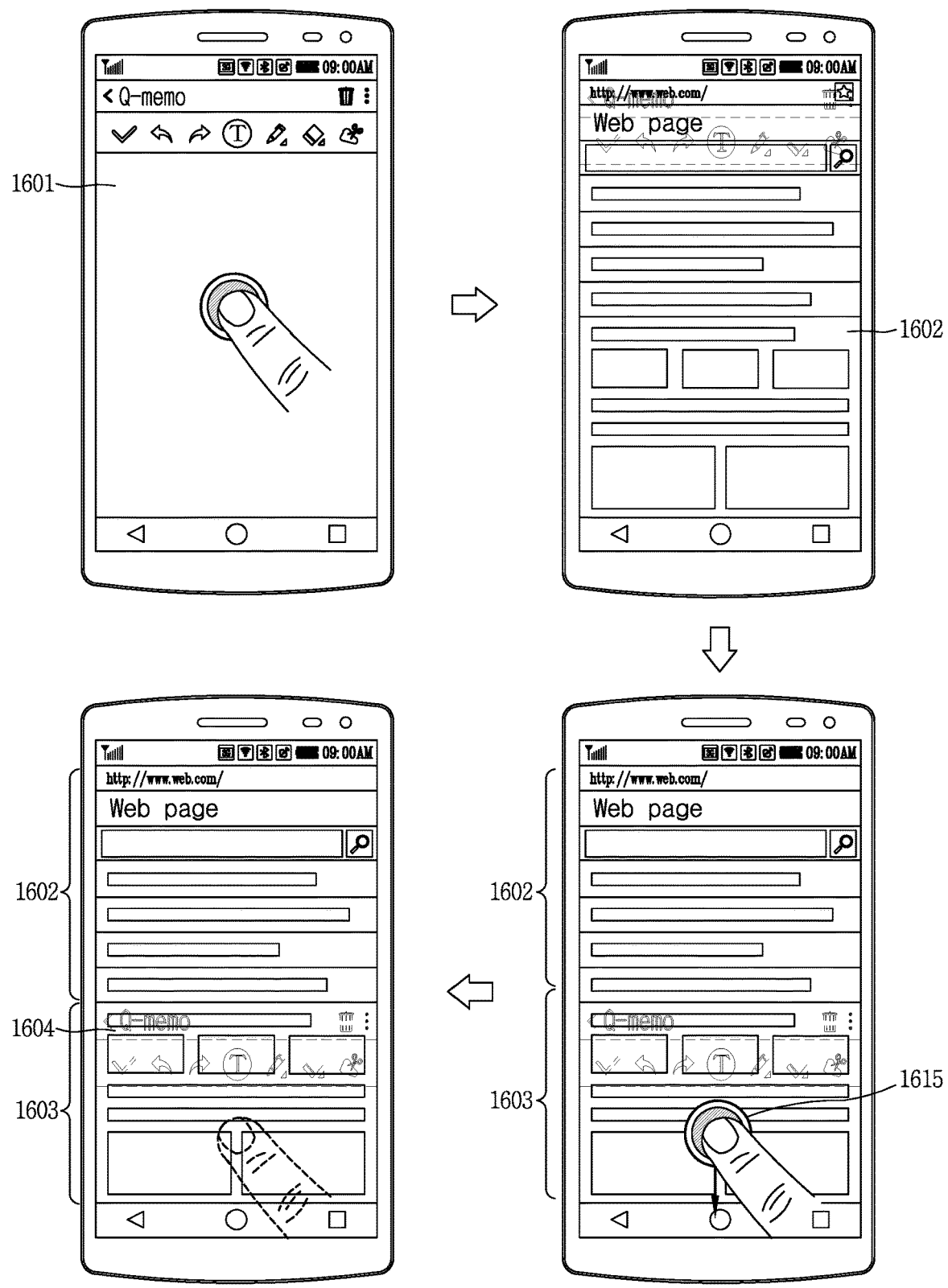
FIGS. 16A and 16B are views illustrating an example of a method of displaying layered screens in a dual window shape according to a level of touch input in a mobile terminal according to an embodiment of the present disclosure.
Figure 16B:
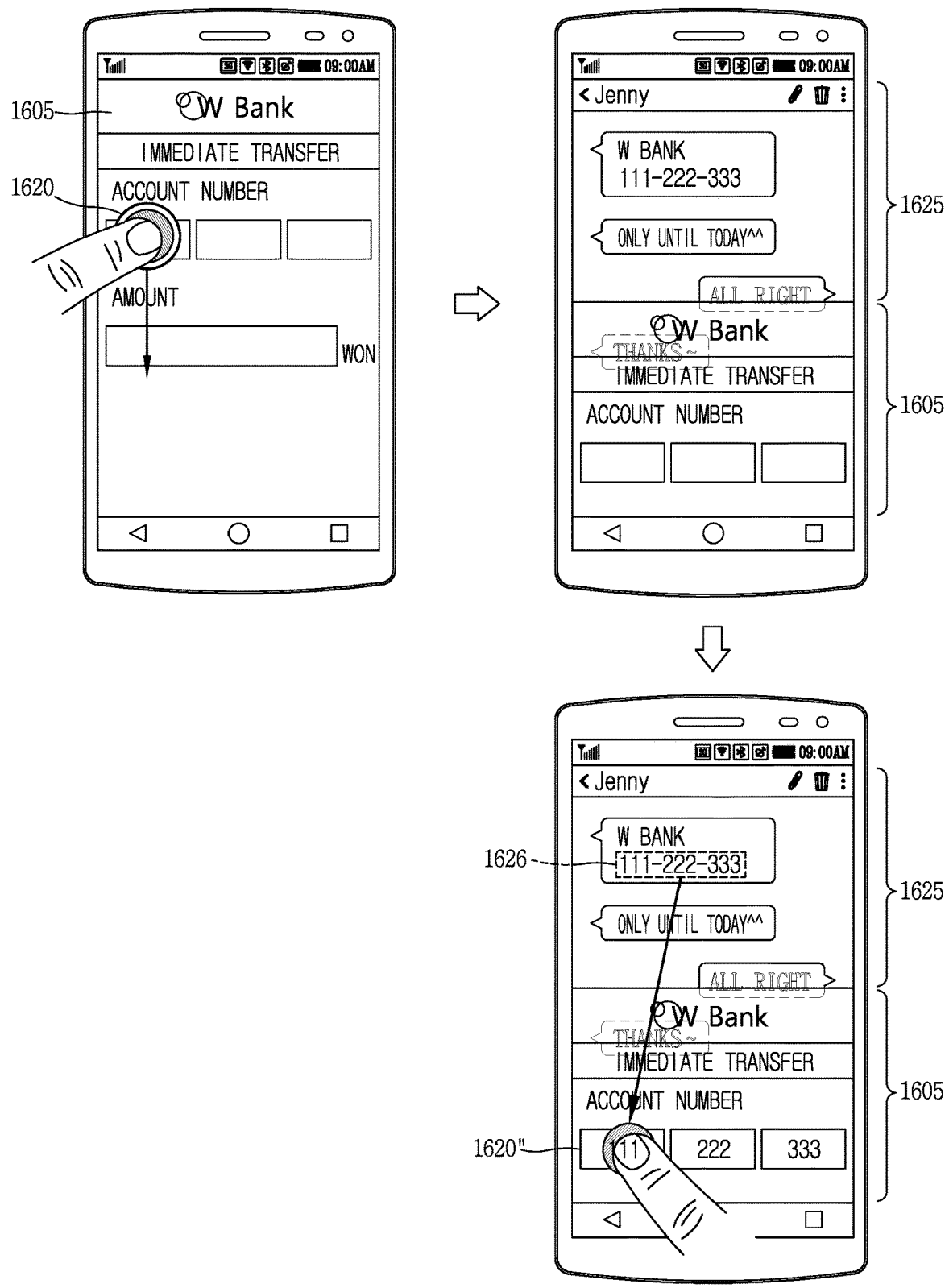

Accordingly, FIGS. 16A and 16B illustrate an example of a method of displaying layered screens in a dual window shape according to a level of touch input. For an example, as illustrated in FIG. 16A, when a touch input is dragged downward (or within a predetermined period of time subsequent to the release) without being released when a webpage layered below and a transparent Q-memo execution screen 1601 are displayed at the same time active state a touch input exceeding a reference pressure is applied to any position of the Q-memo execution screen 1601, the transparent Q-memo execution screen 1601 is moved and displayed along a dragged direction. Accordingly, only a webpage 1602 is displayed at an upper side of the display unit 151, and the transparent Q-memo external device and the remaining portion of the webpage are displayed in an overlapping manner at a lower side thereof.

Then, when the touch input is released, the controller 180 fixes the displayed status, and recognizes an upper and a lower side of the display unit 151 as a dual window. Accordingly, inputs to an upper and a lower side of the display unit 151 may be independently processed. For example, when scrolling is performed in a top-down direction at a lower side of the display unit 151, a webpage 1602 displayed at an upper side of the display unit 151 is maintained without scrolling.

In another example, as illustrated in FIG. 16B, when a touch input exceeding a reference pressure applied to one position of an execution screen 1605 of a financial application, for example, an account number input field region 1620 is dragged downward, an execution screen associated with the region 1620 to which the touch input is applied, for example, a message screen 1625 including account number information, is exhibited at an upper side of the display unit 151 while the displayed execution screen 1605 moves to a lower side of the display unit 151.

At this time, the displayed message screen 1625 is displayed as an uppermost layer at an upper side of the display unit 151, and displayed as an image layered below the execution screen 1605 at a lower side of the display unit 151. In other words, the transparency of the moved execution screen 1605 of the financial application is increased and displayed in a form that the message screen 1625 layered below is seen through.

In this state, when account number information 1626 is selected from the message screen 1625 displayed at an upper side of the display unit 151 or selected and then dragged to an input field 1620, the controller 180 automatically enters the selected account number information 1626 to the input field region 1620 (1620"). Then, when the touch input is released, the display of a dual window shape disappears, and only the execution screen 1605 of a financial application to which an account number is entered may be displayed on the display unit 151.

Further, according to the foregoing embodiments, even when a touch input exceeding a reference pressure is applied to any position, an image layered below is exhibited on the entire display unit 151 or entire virtual keypad or the exhibited image is changed.

Figure 17:
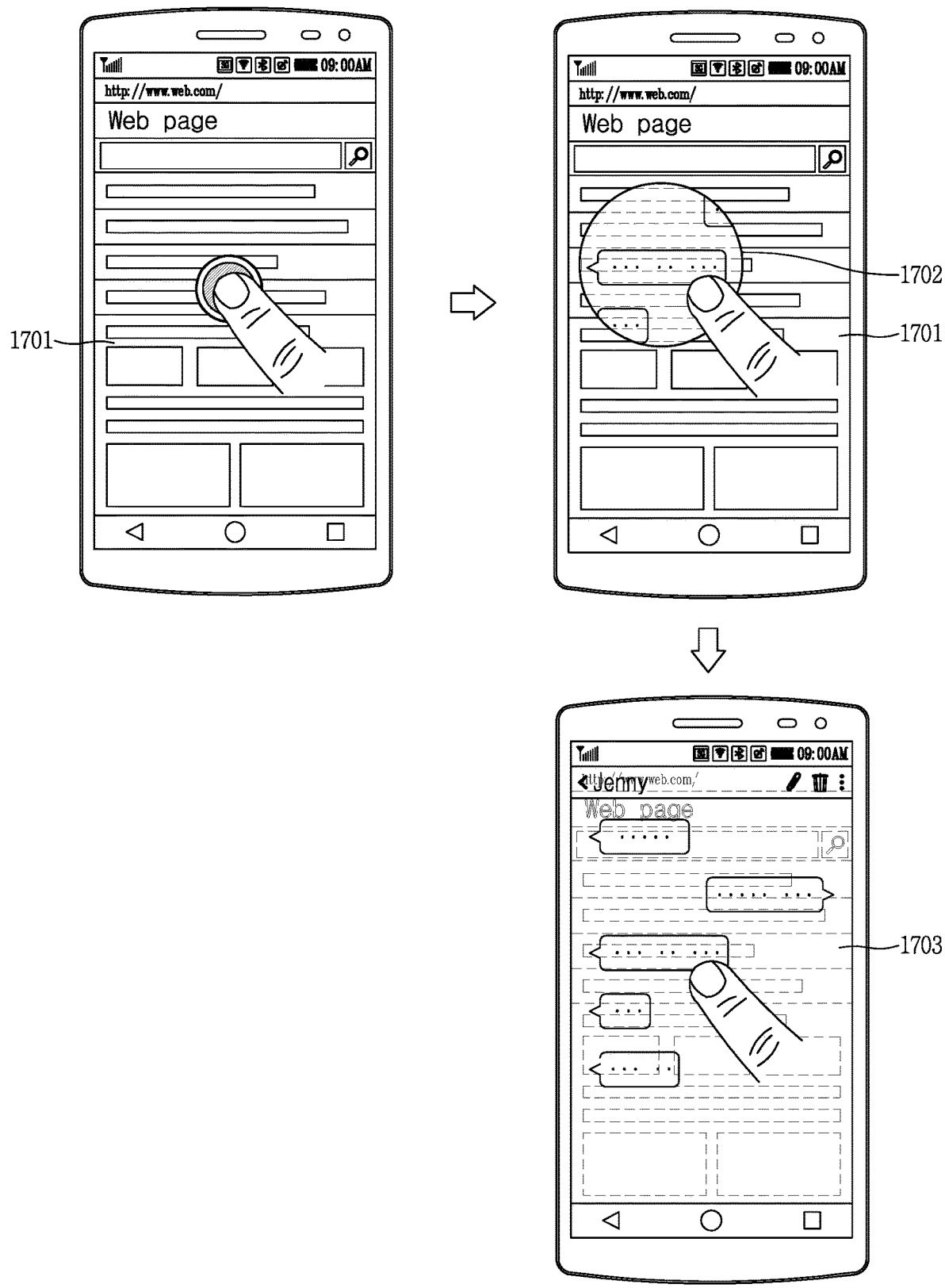
FIG. 17 is a view illustrating a method of displaying a screen layered below on a portion to which a touch input is applied in a mobile terminal according to an embodiment of the present disclosure.

However, as illustrated in FIG. 17, when a touch input exceeding a reference pressure is applied to any position on a displayed webpage 1701, an execution screen layered below may be exhibited while increasing the transparency of the webpage 1701 only in the relevant region while a predetermined region 1702 is exhibited based on the touched any position. Accordingly, a user can predicts a position displayed with information desired to check in advance to check desired information for a short time. Furthermore, an access to a layer at a lower level may be provided with a visual effect and a real metaphor based on a touched position.

Furthermore, when a touch level of a touch input applied to any position is further increased, an execution screen layered below may be controlled to be exhibited on the entire display unit 151 as illustrated in FIG. 17.

As described above, according to a mobile terminal according to an embodiment of the present disclosure and a control method thereof, it is possible to check and control an execution screen layered below while at the same time maintaining a currently displayed screen. Furthermore, a screen layered below selected according to a touch level may be displayed along with a screen that has been viewed by a user, thereby securing the predictability of an interaction. Moreover, information checked on the exhibited execution screen layered below may be immediately entered to a current screen, and an interaction using a virtual keypad may be naturally and subsequently performed without an additional input thereto.

The foregoing present disclosure may be implemented as codes readable by a computer on a medium written by the program. The computer-readable media includes all types of recording devices in which data readable by a computer system can be stored. Examples of the computer-readable media may include HDD (Hard Disk Drive), SSD (Solid State Disk), SDD (Silicon Disk Drive), ROM, RAM, CD-ROM, a magnetic tape, a floppy disk, an optical data storage device, and the like, and also include a device implemented via a carrier wave (for example, transmission via the Internet). Furthermore, the computer may include the controller 180 of the mobile terminal. The detailed description is, therefore, not to be construed as restrictive in all respects but considered as illustrative. The scope of the invention should be determined by reasonable interpretation of the appended claims and all changes that come within the equivalent scope of the invention are included in the scope of the invention.

What is claimed is:

1. A mobile terminal, comprising:
a wireless communication processor configured to provide wireless communication;
a touch screen; and
a controller configured to:
display a first content containing an input field region on the touch screen,
display a virtual keypad on the first content for inputting information into the input field,
in response to a first touch input applied to the virtual keypad exceeding a reference pressure, increase a transparency of the virtual keypad so as to display a screen layered below the virtual keypad, and
in response to a second touch input applied to the screen, limit an input of a control command to a key of the virtual keypad and control the displayed screen based on the second touch input,
wherein the controller is further configured to:
in response to a touch input exceeding a reference pressure applied to the displayed screen layered below the virtual keypad, select a specific object from the displayed screen, and
insert the specific object into the input field region of the first content when the touch input applied to the specific object is dragged,
wherein the displayed screen layered below the virtual keypad disappears when the specific object is inserted into the input field region.

2. The mobile terminal of claim 1, wherein the screen is a partial portion of the first content, and
wherein the controller is further configured to maintain a display status of the first content displayed in a region outside of the virtual keypad while controlling the partial portion of the first content based on the second touch input.

3. The mobile terminal of claim 1, wherein the controller is further configured to:
scroll the screen in a top-down direction in response to a drag touch input applied in a vertical direction to the screen displayed below the virtual keypad, and
switch the screen to an image associated with the screen in response to a drag touch input applied in a horizontal direction to the screen displayed below the virtual keypad.

4. The mobile terminal of claim 1, wherein in response to the first touch input exceeding the reference pressure being released, the controller is further configured to:
decrease the transparency of the virtual keypad so the displayed screen layered below the virtual keypad disappears, and
display information corresponding to an input of a respective key on the virtual keypad.

5. The mobile terminal of claim 4, wherein the controller is further configured to switch the screen displayed below the virtual keypad to a second content selected based on the first content in response to a drag touch input applied in a preset direction to the screen.

6. The mobile terminal of claim 5, wherein in response to the first touch input exceeding the reference pressure being consecutively applied to the virtual keypad for more than a predetermined time, the controller is further configured to change the screen displayed below the transparent keypad to another screen according to a consecutive level of the first touch input.

7. The mobile terminal of claim 1, wherein the controller is further configured to select the screen displayed below the virtual keypad among a plurality of screens according to a touch level of the first touch input exceeding the reference pressure.

8. The mobile terminal of claim 7, wherein the controller is further configured to select the screen displayed below the virtual keypad among the plurality of screens according to a varying touch level of the first touch input exceeding the reference pressure.

9. The mobile terminal of claim 1, wherein in response to at least one object being selected within the screen displayed below the virtual keypad, the controller is further configured to:
　display a clipboard region on the touch screen for copying and pasting the selected object, and
　input the object into the input field region of the first content using the displayed clipboard region.

10. The mobile terminal of claim 1, wherein in response to at least one object being selected within the screen displayed below the virtual keypad, the controller is further configured to:
　display the selected object to appear floating on the virtual keypad, and
　input the selected object into the input field region of the first content or an input region of the virtual keypad according to a path of a drag touch input on the selected object.

11. The mobile terminal of claim 1, wherein in response to the first touch input exceeding the reference pressure being applied to a position outside of the virtual keypad, the controller is further configured to:
　select an execution screen associated with information displayed at the position to which the first touch input is applied among a plurality of execution screens layered below while increasing the transparency of the first content and the virtual keypad, and
　display the selected execution screen as a full screen on the touch screen.

12. The mobile terminal of claim 1, wherein in response to the first touch input exceeding the reference pressure being applied to an object contained in the screen displayed below the virtual keypad, the controller is further configured to display an execution screen associated with the object among a plurality of execution screens layered below on the virtual keypad.

13. The mobile terminal of claim 1, wherein the controller is further configured to:
　display a first icon in one region of the touch screen for deleting, and
　control the screen displayed on the virtual keypad to disappear in response to a touch input being applied to the first icon.

14. The mobile terminal of claim 13, wherein the controller is further configured to:
　switch the first icon to a second icon when the transparency of the virtual keypad decreases according to the touch input applied to the first icon, and
　display a most recently displayed screen again on the virtual keypad while increasing the transparency of the virtual keypad again in response to the touch input being applied to the second icon.

15. The mobile terminal of claim 1, wherein the controller is further configured to display a setting screen for setting characteristics of the virtual keypad while increasing the transparency of the virtual keypad in response to the first touch input exceeding the reference pressure consecutively applied to a boundary region of the virtual keypad.

16. The mobile terminal of claim 1, wherein the controller is further configured to display a clipboard region while moving the virtual keypad with an increased transparency in a dragged direction in response to the first touch input being dragged in one direction.

17. A method of controlling a mobile terminal, the method comprising:
　displaying a first content containing an input field region on a touch screen of the mobile terminal;
　displaying a virtual keypad on the first content for inputting information into the input field;
　in response to a first touch input applied to the virtual keypad exceeding a reference pressure, increasing, via a controller of the mobile terminal, a transparency of the virtual keypad so as to display a screen layered below the virtual keypad;
　in response to a second touch input applied to the screen, limiting, via the controller, an input of a control command to a key of the virtual keypad and controlling the displayed screen based on the second touch input;
　in response to a touch input exceeding a reference pressure applied to the displayed screen layered below the virtual keypad, selecting a specific object from the displayed screen;
　inserting the specific object into the input field region of the first content when the touch input applied to the specific object is dragged; and
　deleting the displayed screen layered below the virtual keypad when the specific object is inserted into the input field region.

18. The method of claim 17, wherein the screen is a partial portion of the first content, and
　wherein the method further comprises maintaining, via the controller, a display status of the first content displayed in a region outside of the virtual keypad while controlling the partial portion of the first content based on the second touch input.

\* \* \* \* \*